United States Patent
Aho et al.

(10) Patent No.: US 8,539,166 B2
(45) Date of Patent: *Sep. 17, 2013

(54) REDUCING REMOTE READS OF MEMORY IN A HYBRID COMPUTING ENVIRONMENT BY MAINTAINING REMOTE MEMORY VALUES LOCALLY

(75) Inventors: Michael E. Aho, Rochester, MN (US); Charles J. Archer, Rochester, MN (US); James E. Carey, Rochester, MN (US); Matthew W. Markland, Rochester, MN (US); Philip J. Sanders, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,636

(22) Filed: Mar. 9, 2012

(65) Prior Publication Data

US 2012/0191920 A1    Jul. 26, 2012

Related U.S. Application Data

(63) Continuation of application No. 12/537,377, filed on Aug. 7, 2009, now Pat. No. 8,180,972.

(51) Int. Cl.
*G06F 12/02* (2006.01)

(52) U.S. Cl.
USPC ..... 711/147; 711/148; 711/153; 711/E12.005

(58) Field of Classification Search
None
See application file for complete search history.

(56) References Cited

U.S. PATENT DOCUMENTS

| | | | |
|---|---|---|---|
| 4,989,131 | A | 1/1991 | Stone |
| 5,073,851 | A | 12/1991 | Masterson et al. |
| 5,363,484 | A | 11/1994 | Desnoyers et al. |
| 5,467,459 | A | 11/1995 | Alexander et al. |
| 5,548,761 | A | 8/1996 | Balasundaram et al. |
| 5,590,345 | A | 12/1996 | Barker et al. |
| 5,613,146 | A | 3/1997 | Gove et al. |
| 5,835,961 | A | 11/1998 | Harvey et al. |
| 5,873,127 | A | 2/1999 | Harvey et al. |
| 5,983,329 | A | 11/1999 | Thaler et al. |
| 6,061,773 | A | 5/2000 | Harvey et al. |
| 6,070,194 | A | 5/2000 | Yu et al. |
| 6,125,430 | A | 9/2000 | Noel et al. |
| 6,266,745 | B1 | 7/2001 | De Backer et al. |

(Continued)

OTHER PUBLICATIONS

Notice of Allowance, U.S. Appl. No. 12/204,842, USPTO Mail Date Mar. 19, 2012.

(Continued)

*Primary Examiner* — Kevin Verbrugge
(74) *Attorney, Agent, or Firm* — Biggers & Ohanian, LLP

(57) ABSTRACT

Reducing remote reads of memory in a hybrid computing environment by maintaining remote memory values locally, the hybrid computing environment including a host computer and a plurality of accelerators, the host computer and the accelerators each having local memory shared remotely with the other, including writing to the shared memory of the host computer packets of data representing changes in accelerator memory values, incrementing, in local memory and in remote shared memory on the host computer, a counter value representing the total number of packets written to the host computer, reading by the host computer from the shared memory in the host computer the written data packets, moving the read data to application memory, and incrementing, in both local memory and in remote shared memory on the accelerator, a counter value representing the total number of packets read by the host computer.

20 Claims, 10 Drawing Sheets

(56) References Cited

U.S. PATENT DOCUMENTS

| | | | |
|---|---|---|---|
| 6,275,857 | B1 | 8/2001 | McCartney |
| 6,308,255 | B1 | 10/2001 | Gorishek et al. |
| 6,330,659 | B1 | 12/2001 | Poff et al. |
| 6,377,979 | B1 | 4/2002 | Yamashita et al. |
| 6,473,849 | B1 | 10/2002 | Keller et al. |
| 6,556,659 | B1 | 4/2003 | Bowman-Amuah |
| 6,598,130 | B2 | 7/2003 | Harris et al. |
| 6,651,132 | B1 | 11/2003 | Traut |
| 6,658,522 | B1 | 12/2003 | Martin et al. |
| 6,918,070 | B1 | 7/2005 | Sharma |
| 6,948,034 | B2 | 9/2005 | Aoki |
| 7,383,330 | B2 | 6/2008 | Moran et al. |
| 7,418,574 | B2 | 8/2008 | Mathur et al. |
| 7,428,573 | B2 | 9/2008 | McCanne et al. |
| 7,436,824 | B2 | 10/2008 | Pepenella |
| 7,469,273 | B2 | 12/2008 | Anderson et al. |
| 7,478,154 | B2 | 1/2009 | Cochran et al. |
| 7,631,023 | B1 | 12/2009 | Kaiser et al. |
| 7,668,924 | B1 | 2/2010 | Young et al. |
| 7,725,905 | B1 | 5/2010 | Doshi et al. |
| 7,814,295 | B2 | 10/2010 | Inglett et al. |
| 8,132,106 | B2 | 3/2012 | Low et al. |
| 2002/0056033 | A1 | 5/2002 | Huppenthal |
| 2002/0108059 | A1 | 8/2002 | Canion et al. |
| 2002/0112091 | A1 | 8/2002 | Schott et al. |
| 2003/0028751 | A1 | 2/2003 | McDonald et al. |
| 2003/0061432 | A1 | 3/2003 | Huppenthal et al. |
| 2003/0120723 | A1 | 6/2003 | Bright et al. |
| 2003/0226018 | A1 | 12/2003 | Tardo et al. |
| 2004/0221127 | A1 | 11/2004 | Ang |
| 2005/0273571 | A1 | 12/2005 | Lyon et al. |
| 2005/0278680 | A1 | 12/2005 | Mukherjee et al. |
| 2006/0018341 | A1 | 1/2006 | Pettey et al. |
| 2006/0168435 | A1 | 7/2006 | Svensson et al. |
| 2006/0224830 | A1 | 10/2006 | Davis et al. |
| 2007/0112999 | A1 | 5/2007 | Oney et al. |
| 2007/0113227 | A1 | 5/2007 | Oney et al. |
| 2007/0226807 | A1 | 9/2007 | Ginter et al. |
| 2007/0255802 | A1 | 11/2007 | Aloni et al. |
| 2007/0294505 | A1 | 12/2007 | Traut et al. |
| 2008/0028103 | A1 | 1/2008 | Schlansker et al. |
| 2008/0091855 | A1 | 4/2008 | Moertl et al. |
| 2008/0183882 | A1 | 7/2008 | Flynn et al. |
| 2008/0222396 | A1 | 9/2008 | Spracklen et al. |
| 2008/0256330 | A1 | 10/2008 | Wang et al. |
| 2008/0259086 | A1 | 10/2008 | Doi et al. |
| 2008/0288747 | A1 | 11/2008 | Inglett et al. |
| 2009/0024734 | A1 | 1/2009 | Merbach et al. |
| 2009/0080428 | A1 | 3/2009 | Witkowski et al. |
| 2009/0110326 | A1 | 4/2009 | Kim et al. |
| 2009/0276601 | A1 | 11/2009 | Kancherla |
| 2010/0036940 | A1 | 2/2010 | Carey et al. |
| 2010/0058031 | A1 | 3/2010 | Aho et al. |
| 2010/0058356 | A1 | 3/2010 | Aho et al. |
| 2010/0064295 | A1 | 3/2010 | Aho et al. |
| 2010/0107243 | A1 | 4/2010 | Moyer et al. |
| 2010/0153541 | A1 | 6/2010 | Arimilli et al. |
| 2010/0191711 | A1 | 7/2010 | Carey et al. |
| 2010/0191822 | A1 | 7/2010 | Archer et al. |
| 2010/0191823 | A1 | 7/2010 | Archer et al. |
| 2010/0191909 | A1 | 7/2010 | Archer et al. |
| 2010/0191917 | A1 | 7/2010 | Archer et al. |
| 2010/0191923 | A1 | 7/2010 | Archer et al. |
| 2010/0192123 | A1 | 7/2010 | Carey et al. |
| 2010/0198997 | A1 | 8/2010 | Archer et al. |
| 2010/0274868 | A1 | 10/2010 | Arroyo et al. |
| 2011/0191785 | A1 | 8/2011 | Archer et al. |
| 2011/0239003 | A1 | 9/2011 | Archer et al. |
| 2011/0271059 | A1 | 11/2011 | Aho et al. |

OTHER PUBLICATIONS

Notice of Allowance, U.S. Appl. No. 12/204,391, USPTO Mail Date Dec. 7, 2011.
Final Office Action, U.S. Appl. No. 12/358,663, USPTO Mail Date Mar. 21, 2012.
Final Office Action, U.S. Appl. No. 12/359,383, USPTO Mail Date Jan. 27, 2012.
Final Office Action, U.S. Appl. No. 12/361,943, USPTO Mail Date Jan. 31, 2012.
Office Action, U.S. Appl. No. 12/360,158, USPTO Mail Date Jan. 19, 2012.
Notice of Allowance, U.S. Appl. No. 12/537,377, USPTO Mail Date Jan. 13, 2012.
Notice of Allowance, U.S. Appl. No. 12/248,646, USPTO Mail Date Jun. 9, 2011.
Office Action, U.S. Appl. No. 12/699,162, USPTO Mail Date Apr. 27, 2012.
Rabenseifner, R., "Some Aspects of Message-Passing on Future Hybrid Systems (Extended Abstract)," http://www.springerlink.com/content/978-3-540-87474-4/#section=258981&page=2&locus=19, accessed online May 16, 2012, 3 pages.
Ball, S., "Introduction to direct memory access," http://www.eetimes.com/discussion/other/4024879/Introduction-to-direct-memory-access, accessed online May 16, 2012, 2 pages.
Buonadonna, Phillip, Culler, David, "Queue Pair IP: A Hybrid Architecture for System Area Networks", Aug. 7, 2002, Computer Architecture, 2002. Proceedings. 29th Annual Symposium, pp. 247-256.
Brightwell, Rin, Doerfler, Doug, Underwood D., Keith, "A Preliminary Analysis of the Infiniband and XD1 Network Interfaces", Jun. 26, 2006, Parallel and Distribution Processing Symposium, 2006. IPDPS 2006. 20th International, 8 pp.
Rexford, Jennifer, Bonomi Flavio; Greenberg Albert, Wong Albert, "Scalable Architectures for Integrated Traffic Shaping and Link Scheduling in High-Speed ATM Switches", Jun. 5, 1997, IEEE Journal on Selected Areas in Communications, vol. 15 No. 5, pp. 938-950.
Office Action, U.S. Appl. No. 12/204,352, USTPO Mail Date, Dec. 16, 2010 9 pp.
Final Office Action, U.S. Appl. No. 12/189,342, USPTO Mail Date Dec. 23, 2010, 35 pp.
Office Action, U.S. Appl. No. 12/362,137, USPTO Mail Date Nov. 22, 2010, 12 pp.
Office Action, U.S. Appl. No. 12/364,590, USPTO Mail Date Nov. 26, 2010, 12 pp.
Office Action, U.S. Appl. No. 12/361,910, USPTO Mail Date Nov. 19, 2010, 12 pp.
Office Action, U.S. Appl. No. 12/428,646, USPTO Mail Date Feb. 7, 2011, 13 pp.
Notice of Allowance, U.S. Appl. No. 12/204,352, USPTO Mail Date Mar. 14, 2011, 12 pp.
Final Office Action, U.S. Appl. No. 12/362,137, USPTO Mail Date Apr. 25, 2011, 13 pp.
Notice of Allowance, U.S. Appl. No. 12/364,590, USPTO Mail Date Apr. 29, 2011, 10 pp.
Notice of Allowance, U.S. Appl. No. 12/361,910, USPTO Mail Date Apr. 5, 2011, 11 pp.
Office Action, U.S. Appl. No. 12/204,391, USPTO Mail Date Aug. 17, 2011, 15 pp.
Office Action, U.S. Appl. No. 12/358,663, USPTO Mail Date Oct. 5, 2011, 26 pp.
Office Action, U.S. Appl. No. 12/359,383, USPTO Mail Date Aug. 5, 2011, 26 pp.
Office Action, U.S. Appl. No. 12/361,943, USPTO Mail Date Sep. 21, 2011, 20 pp.
Office Action, U.S. Appl. No. 12/189,342, USPTO Mail Date Jul. 26, 2011, 19 pp.
U.S. Appl. No. 12/204,842, filed Sep. 2008, Aho et al.
U.S. Appl. No. 12/204,352, filed Sep. 2008, Aho et al.
U.S. Appl. No. 12/204,391, filed Sep. 2008, Aho et al.
U.S. Appl. No. 12/189,342, filed Aug. 2008, Carey et al.
U.S. Appl. No. 12/358,663, filed Jan. 2009, Archer et al.
U.S. Appl. No. 12/699,162, filed Feb. 2010, Archer et al.
U.S. Appl. No. 12/362,137, filed Jan. 2009, Archer et al.
U.S. Appl. No. 12/359,383, filed Jan. 2009, Archer et al.
U.S. Appl. No. 12/361,943, filed Jan. 2009, Archer et al.
U.S. Appl. No. 12/360,930, filed Jan. 2009, Carey et al.
U.S. Appl. No. 12/364,590, filed Feb. 2009, Archer et al.
U.S. Appl. No. 12/360,158, filed Jan. 2009, Carey et al.
U.S. Appl. No. 12/537,377, filed Aug. 2009, Aho et al.

U.S. Appl. No. 12/361,910, filed Jan. 2009, Archer et al.
U.S. Appl. No. 12/428,646, filed Apr. 2009, Arroyo et al.
U.S. Appl. No. 12/771,627, filed Apr. 2010, Aho et al.
Martellaro, "Using the cell processor as an offload streaming assist for sessionization of network traffic for cross packet inspector", Aug. 2008, pp. 21-24.
Notice of Allowance, U.S. Appl. No. 12/358,663, USPTO Mail Date Jan. 14, 2013.
RCE filed, U.S. Appl. No. 12/358,663, USPTO Mail Date Mar. 21, 2013.
Office Action, U.S. Appl. No. 12/748,559, USPTO Mail Date Feb. 21, 2013.
Office Action, U.S. Appl. No. 13/664,557, USPTO Mail Date Feb. 1, 2013.
Final Office Action, U.S. Appl. No. 12/699,162, USPTO Mail Date Aug. 8, 2012.
Office Action, U.S. Appl. No. 12/360,158, USPTO Mail Date Aug. 6, 2012.
Office Action, U.S. Appl. No. 13/439,479, USPTO Mail Date Nov. 2, 2012.

REDUCING REMOTE READS OF MEMORY IN A HYBRID COMPUTING ENVIRONMENT BY MAINTAINING REMOTE MEMORY VALUES LOCALLY

CROSS-REFERENCE TO RELATED APPLICATION

This application is a continuation application of and claims priority from U.S. patent application Ser. No. 12/537,377, filed on Aug. 7, 2009.

BACKGROUND OF THE INVENTION

1. Field of the Invention

The field of the invention is data processing, or, more specifically, methods, apparatus, and products for reducing remote reads of memory in a hybrid computing environment by maintaining remote memory values locally.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Computer systems today have advanced such that some computing environments now include core components of different architectures which operate together to complete data processing tasks. Such computing environments are described in this specification as 'hybrid' environments, denoting that such environments include host computers and accelerators having different architectures. Although hybrid computing environments are more computationally powerful and efficient in data processing than many non-hybrid computing environments, such hybrid computing environments still present substantial challenges to the science of automated computing machinery.

SUMMARY OF THE INVENTION

Methods, apparatus, and products for reducing remote reads of memory in a hybrid computing environment by maintaining remote memory values locally, the hybrid computing environment including a host computer having a host computer architecture, a plurality of accelerators having an accelerator architecture, the accelerator architecture optimized, with respect to the host computer architecture, for speed of execution of a particular class of computing functions, the host computer and the accelerators adapted to one another for data communications by a system level message passing module, the host computer having local memory shared remotely with the accelerators, each accelerator having local memory shared remotely with the host computer, the shared memory on both the host and the accelerators each configured as a predefined number of individual memory segments, including writing by an accelerator when one or more memory values in accelerator application memory change, through the system level message passing module to the shared memory of the host computer beginning at a next available memory segment, one or more packets of data representing the changes in accelerator memory values, including incrementing, in both local shadow memory on the accelerator and in remote shared memory on the host computer, a counter value representing the total number of packets written by the accelerator to the shared memory in the host computer and reading by the host computer asynchronously with respect to the writing, from the shared memory in the host computer beginning with a next unread memory segment, the packets of data written by the accelerator to the shared memory in the host computer, including moving the read data to application memory of the host computer and incrementing, in both local shadow memory on the host computer and in remote shared memory on the accelerator, a counter value representing the total number of packets read by the host computer from the shared memory in the host computer.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
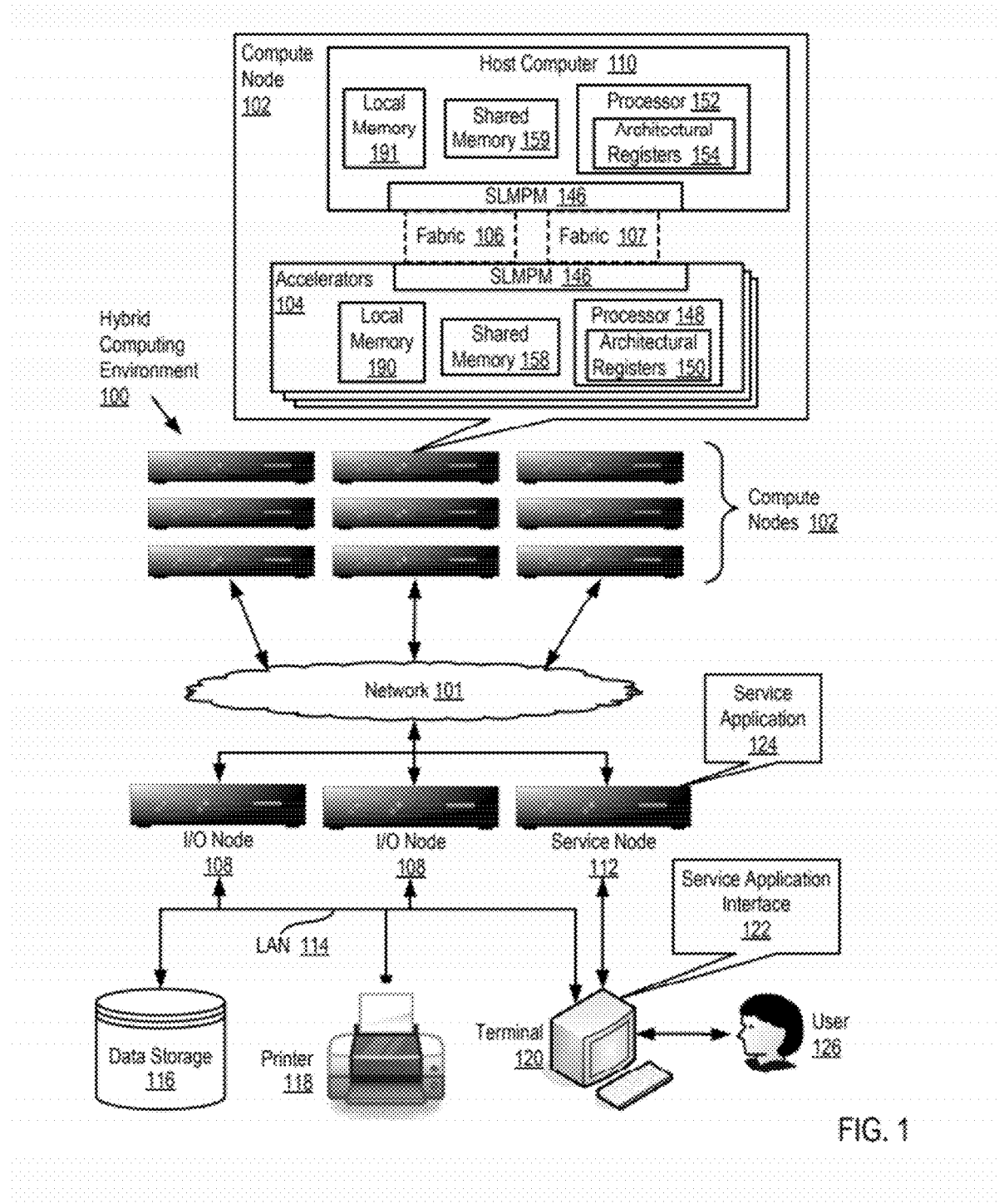
FIGS. 1-4 set forth block diagrams of example hybrid computing environments that reduce remote reads of memory by maintaining remote memory values locally according to embodiments of the present invention.

Example methods, apparatus, and products for reducing remote reads of memory in a hybrid computing environment by maintaining remote memory values locally according to embodiments of the present invention are described with reference to the accompanying drawings, beginning with FIG. 1. FIG. 1 sets forth a diagram of an example hybrid computing environment (100) that reduces remote reads of memory by maintaining remote memory values locally according to embodiments of the present invention. A 'hybrid computing environment,' as the term is used in this specification, is a computing environment in that it includes computer processors (148, 152) operatively coupled to computer memory (190, 191) so as to implement data processing in the form of execution of computer program instructions stored in the memory and executed on the processors.

The hybrid computing environment (100) in the example of FIG. 1 also includes at least one host computer (110) having a host architecture that operates in cooperation with an accelerator (104) having an accelerator architecture where the host architecture and accelerator architecture are different architectures. The host and accelerator architectures in this example are characterized by architectural registers (154, 150), registers that are accessible by computer program instructions that execute on each architecture, registers such as, for example, an instruction register, a program counter, memory index registers, stack pointers, and the like. That is, the number, type, structure, and relations among the architectural registers of the two architectures are different, so different that computer program instructions compiled for execution on the host computer of a hybrid computing environment typically cannot be executed natively by any associated accelerator of the hybrid computing environment. Examples of hybrid computing environments include a data processing system that in turn includes one or more host computers, each having an x86 processor, and accelerators whose architectural registers implement the PowerPC instruction set. Computer program instructions compiled for execution on the x86 processors in the host computers cannot be executed natively by the PowerPC processors in the accelerators. Readers will recognize in addition that some of the example hybrid computing environments described in this specification are based upon the Los Alamos National Laboratory ('LANL') supercomputer architecture developed in the LANL Roadrunner project (named for the state bird of New Mexico), the supercomputer architecture that famously first generated a 'petaflop,' a million billion floating point operations per second. The LANL supercomputer architecture includes many host computers with dual-core AMD Opteron processors coupled to many accelerators with IBM Cell processors, the Opteron processors and the Cell processors having different architectures.

The example hybrid computing environment (100) of FIG. 1 includes a plurality of compute nodes (102), I/O nodes (108), and a service node (112). The compute nodes (102) are coupled through network (101) for data communications with one another and with the I/O nodes (108) and the service node (112). The data communications network (101) may be implemented as an Ethernet, Internet Protocol (In, PCIe, Infiniband, Fibre Channel, or other network as will occur to readers of skill in the art.

In the example hybrid computing environment (100) of FIG. 1, the compute nodes carry out principal user-level computer program execution, accepting administrative services, such as initial program loads and the like, from the service application (124) executing on the service node (112) and gaining access to data storage (116) and I/O functionality (118, 120) through the I/O nodes (108). In the example of FIG. 1, the I/O nodes (108) are connected for data communications to I/O devices (116, 118, 120) through a local area network ('LAN') (114) implemented using high-speed Ethernet or a data communications fabric of another fabric type as will occur to those of skill in the art. I/O devices in the example hybrid computing environment (100) of FIG. 1 include non-volatile memory for the computing environment in the form of data storage device (116), an output device for the hybrid computing environment in the form of printer (118), and a user (126) I/O device in the form of computer terminal (120) that executes a service application interface (122) that provides to a user an interface for configuring compute nodes in the hybrid computing environment and initiating execution by the compute nodes of principal user-level computer program instructions.

In the example of FIG. 1, each compute node includes a host computer (110) having a host computer architecture and one or more accelerators (104) having an accelerator architecture. A host computer (110) is a 'host' in the sense that it is the host computer that carries out interface functions between a compute node and other components of the hybrid computing environment external to any particular compute node. That is, it is the host computer that executes initial boot procedures, power on self tests, basic I/O functions, accepts user-level program loads from service nodes, and so on. An accelerator (104) is an 'accelerator' in that each accelerator has an accelerator architecture that is optimized, with respect to the host computer architecture, for speed of execution of a particular class of computing functions. Such accelerated computing functions include, for example, vector processing, floating point operations, and others as will occur to those of skill in the art.

Because each of the compute nodes (102) in the example of FIG. 1 includes a host computer (110) and an accelerator (104), readers of skill in the art will recognize that each compute node represents a smaller, separate hybrid computing environment within the larger hybrid computing environment (100) of FIG. 1. That is, not only may the combination of the compute nodes (102) form a hybrid computing environment (100), but it is also the case that each individual compute node may also be viewed as a separate, smaller hybrid computing environment. The hybrid computing environment (100) in the example of FIG. 1 then, properly may be viewed as composed of nine separate, smaller hybrid computing environments, one for each compute node, which taken together form the hybrid computing environment (100) of FIG. 1.

Within each compute node (102) of FIG. 1, a host computer (110) and one or more accelerators (104) are adapted to one another for data communications by a system level message passing module ('SLMPM') (146) and by two or more data communications fabrics (106, 107) of at least two different fabric types. An SLMPM (146) is a module of automated computing machinery typically including a library of computer program instructions that exposes an application programming interface ('API') to user-level applications for carrying out message-based data communications between the host computer (110) and the accelerator (104). The SLMPM may be viewed as messaging middleware—or a messaging layer in the overall architecture of a hybrid computing environment. Examples of message-based data communications libraries that may be improved for use as an SLMPM according to embodiments of the present invention include:

the Message Passing Interface or 'MPI,' an industry standard interface in two versions, first presented at Supercomputing 1994, not sanctioned by any major standards body, the Data Communication and Synchronization interface ('DACS') of the LANL supercomputer, the POSIX Threads library ('Pthreads'), an IEEE standard for distributed, multithreaded processing, the Open Multi-Processing interface ('OpenMP'), an industry-sanctioned specification for parallel programming, and other libraries that will occur to those of skill in the art.

A data communications fabric (106, 107) is a configuration of data communications hardware and software that implements a data communications coupling between a host computer and an accelerator. Examples of data communications fabric types include Peripheral Component Interconnect ('PCI'), PCI express ('PCIe'), Ethernet, Infiniband, Fibre Channel, Small Computer System Interface ('SCSI'), External Serial Advanced Technology Attachment ('eSATA'), Universal Serial Bus ('USB'), and so on as will occur to those of skill in the art.

The example hybrid computing environment (100) of FIG. 1 is configured for reducing remote reads of memory by maintaining remote memory values locally in accordance with embodiments of the present invention. A remote read is a read of memory values from remote shared memory, and whether shared memory is local or remote is a matter of perspective. A read of a memory value by a host computer from shared memory on an accelerator is a remote read, and a read of a memory value by an accelerator from shared memory on a host computer is a remote read. At the same time, a read of a memory value by a host computer from shared memory on the host computer is a local read, and a read of a memory value by an accelerator from shared memory on the acclerator is a local read. It is generally very desirable to avoid remote reads. In typical hybrid computing environments, a remote read requires both a transmission of a request for data as well as a return transmission of the data itself, two messages through an SLMPM, while a remote write typically requires only one such message transmitting the data to be written in remote shared memory. While a remote read so described may superficially appear to require merely twice the data processing resources of a remote write, two messages instead of one, in fact, because of the additional processing required by the request for data—not linear in proportion to a remote write—such a remote read in many embodiments can require an order of magnitude more data processing resources than a remote write.

Each host computer in this example has local memory (191) some portion of which is shared (159) remotely with the accelerators, and each accelerator has local memory (190) some portion of which is shared (158) remotely with the host computer. The shared memory (158, 159) on both the host and the accelerators is each configured as a predefined number of individual memory segments. The hybrid computing environment in this example reduces remote reads of memory as follows. When one or more memory values in accelerator application memory (190) changes, the accelerator (104) writes through the SLMPM (146) to the shared memory (159) of the host computer (110) beginning at a next available memory segment, one or more packets of data representing the changes in accelerator memory values. The accelerator then increments, in both local shadow memory (190) on the accelerator and also in remote shared memory (159) on the host computer, a counter value representing the total number of packets written by the accelerator to the shared memory in the host computer. The host computer (110), having received data packets, reads, from the shared memory (159) in the host computer beginning with a next unread memory segment, the packets of data written by the accelerator to the shared memory in the host computer. The host's reading of the written data is carried out asynchronously with respect to the writing by the accelerator. Having read the data, the host computer then moves the read data to application memory of the host computer and increments, in both local shadow memory (191) on the host computer and in remote shared memory (158) on the accelerator, a counter value representing the total number of packets read by the host computer from the shared memory in the host computer.

The function of reducing remote reads of memory in the example of FIG. 1 is effectively bi-directional. When one or more memory values in a host computer's application memory (191) changes, the host computer (110) writes through the SLMPM (146) to the shared memory (158) of the accelerator beginning at a next available memory segment, one or more packets of data representing the changes in host computer memory values. The host computer (110) then increments, in both local shadow memory (191) on the host computer and also in remote shared memory (158) on the accelerator, a counter value representing the total number of packets written by the host computer to the shared memory in the accelerator. The accelerator (104), having received data packets, reads, from the shared memory (158) in the accelerator beginning with a next unread memory segment, the packets of data written by the host computer to the shared memory in the accelerator. The accelerator's reading of the written data is carried out asynchronously with respect to the writing by the host computer. Having read the data, the accelerator (104) then moves the read data to application memory (190) of the accelerator and increments, in both local shadow memory (190) on the accelerator and also in remote shared memory (159) on the host computer, a counter value representing the total number of packets read by the accelerator from the shared memory in the accelerator.

The arrangement of compute nodes, data communications fabrics, networks, I/O devices, service nodes, I/O nodes, and so on, making up the hybrid computing environment (100) as illustrated in FIG. 1 are for explanation only, not for limitation of the present invention. Hybrid computing environments capable of reducing remote reads of memory by maintaining remote memory values locally according to embodiments of the present invention may include additional nodes, networks, devices, and architectures, not shown in FIG. 1, as will occur to those of skill in the art. Although the hybrid computing environment (100) in the example of FIG. 1 includes only nine compute nodes (102), readers will note that hybrid computing environments according to embodiments of the present invention may include any number of compute nodes. The LANL supercomputer, taken as an example of a hybrid computing environment with multiple compute nodes, contains as of this writing more than 12,000 compute nodes. Networks and data communications fabrics in such hybrid computing environments may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
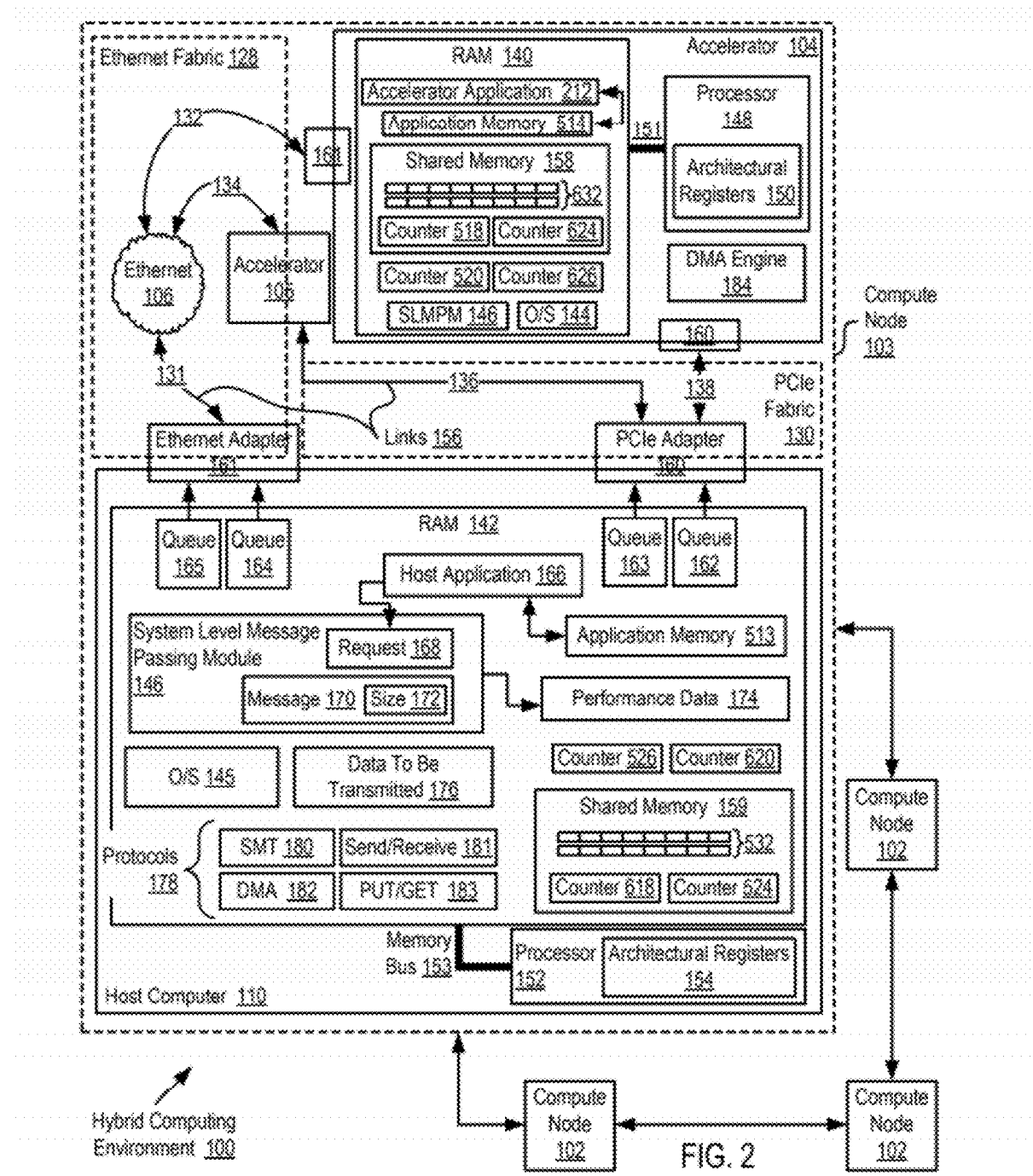

For further explanation, FIG. 2 sets forth a block diagram of an example hybrid computing environment (100) reduces remote reads of memory by maintaining remote memory values locally according to embodiments of the present invention. The hybrid computing environment (100) of FIG. 2 includes four compute nodes (102, 103). Similar to the compute nodes of FIG. 1, each of the compute nodes in the example of FIG. 2 may represent a small, separate hybrid computing environment which taken together make up a larger hybrid computing environment. One compute node (103) in the example of FIG. 2 is illustrated in an expanded view to aid a more detailed explanation of such a hybrid computing environment (100). As shown in the expanded view of compute node (103), each of the compute nodes (102, 103) in the example of FIG. 2 includes a host computer (110). The host computer (110) includes a computer processor (152) operatively coupled to computer memory, Random Access Memory ('RAM') (142), through a high speed memory bus (153). The processor (152) in each host computer (110) has a set of architectural registers (154) that defines the host computer architecture.

Each of the compute nodes also includes one or more accelerators (104, 105). Each accelerator (104, 105) includes a computer processor (148) operatively coupled to RAM (140) through a high speed memory bus (151). Stored in RAM (140,142) of the host computer and the accelerators (104, 105) is an operating system (145). Operating systems useful in host computers and accelerators of hybrid computing environments according to embodiments of the present invention include UNIX™, Linux™, Microsoft XP™, Microsoft Vista™, Microsoft NT™, AIX™, IBM's i5/OS™, and others as will occur to those of skill in the art. There is no requirement that the operating system in the host computers should be the same operating system used on the accelerators.

The processor (148) of each accelerator (104, 105) has a set of architectural registers (150) that defines the accelerator architecture. The architectural registers (150) of the processor (148) of each accelerator are different from the architectural registers (154) of the processor (152) in the host computer (110). With differing architectures, it would be uncommon, although possible, for a host computer and an accelerator to support the same instruction sets. As such, computer program instructions compiled for execution on the processor (148) of an accelerator (104) generally would not be expected to execute natively on the processor (152) of the host computer (110) and vice versa. Moreover, because of the typical differences in hardware architectures between host processors and accelerators, computer program instructions compiled for execution on the processor (152) of a host computer (110) generally would not be expected to execute natively on the processor (148) of an accelerator (104) even if the accelerator supported the instruction set of the host. The accelerator architecture in example of FIG. 2 is optimized, with respect to the host computer architecture, for speed of execution of a particular class of computing functions. That is, for the function or functions for which the accelerator is optimized, execution of those functions will proceed faster on the accelerator than if they were executed on the processor of the host computer.

In the example of FIG. 2, the host computer (110) and the accelerators (104, 105) are adapted to one another for data communications by a system level message passing module ('SLMPM') (146) and two data communications fabrics (128, 130) of at least two different fabric types. In this example, to support message-based data communications between the host computer (110) and the accelerator (104), both the host computer (110) and the accelerator (104) have an SLMPM (146) so that message-based communications can both originate and be received on both sides of any coupling for data communications. Also in the example of FIG. 2, the host computer (110) and the accelerators (104, 105) are adapted to one another for data communications by a PCIe fabric (130) through PCIe communications adapters (160) and an Ethernet fabric (128) through Ethernet communications adapters (161). The use of PCIe and Ethernet is for explanation, not for limitation of the invention. Readers of skill in the art will immediately recognize that hybrid computing environments according to embodiments of the present invention may include fabrics of other fabric types such as, for example, PCI, Infiniband, Fibre Channel, SCSI, eSATA, USB, and so on.

The SLMPM (146) in this example operates generally for data processing in a hybrid computing environment (100) by monitoring data communications performance for a plurality of data communications modes between the host computer (110) and the accelerators (104, 105), receiving a request (168) to transmit data according to a data communications mode from the host computer to an accelerator, determining whether to transmit the data according to the requested data communications mode, and if the data is not to be transmitted according to the requested data communications mode: selecting another data communications mode and transmitting the data according to the selected data communications mode. In the example of FIG. 2, the monitored performance is illustrated as monitored performance data (174) stored by the SLMPM (146) in RAM (142) of the host computer (110) during operation of the compute node (103).

A data communications mode specifies a data communications fabric type, a data communications link, and a data communications protocol (178). A data communications link (156) is data communications connection between a host computer and an accelerator. In the example of FIG. 2, a link (156) between the host computer (110) and the accelerator (104) may include the PCIe connection (138) or the Ethernet connection (131, 132) through the Ethernet network (106). A link (156) between the host computer (110) and the accelerator (105) in the example of FIG. 2, may include the PCIe connection (136) or the Ethernet connection (131, 134) through the Ethernet network (106). Although only one link for each fabric type is illustrated between the host computer and the accelerator in the example of FIG. 2, readers of skill in the art will immediately recognize that there may any number of links for each fabric type.

A data communications protocol is a set of standard rules for data representation, signaling, authentication and error detection required to send information from a host computer (110) to an accelerator (104). In the example of FIG. 2, the SLMPM (146) may select one of several protocols (178) for data communications between the host computer (110) and the accelerator. Examples of such protocols (178) include shared memory transfers ('SMT') (180) executed with a send and receive operations (181), and direct memory access ('DMA') (182) executed with PUT and GET operations (183).

Shared memory transfer is a data communications protocol for passing data between a host computer and an accelerator into shared memory space (158) allocated for such a purpose such that only one instance of the data necessarily resides in memory at any particular time. Consider the following as an example shared memory transfer between the host computer (110) and the accelerator (104) of FIG. 2. An application (166) requests (168) a transmission of data (176) from the host computer (110) to the accelerator (104) in accordance with the SMT (180) protocol. Such a request (168) may include a memory address allocated for such shared memory. In this example, the shared memory segment (158) is illustrated in a memory location on the accelerator (104), but readers will recognize that shared memory segments may be located on the accelerator (104), on the host computer (110), on both the host computer and the accelerator, or even off the local compute node (103) entirely—so long as the segment is accessible as needed by the host and the accelerator. To carry out a shared memory transfer, the SLMPM (146) on the host computer (110) establishes a data communications connection with the SLMPM (146) executing on the accelerator (104) by a handshaking procedure similar to that in the TCP protocol. The SLMPM (146) then creates a message (170) that includes a header and payload data and inserts the message into a message transmit queue for a particular link of a particular fabric. In creating the message, the SLMPM inserts, in the header of the message, an identification of the accelerator and an identification of a process executing on the accelerator. The SLMPM also inserts the memory address from the request (168) into the message, either in the header or as part of the payload data. The SLMPM also inserts the data (176) to be transmitted in the message (170) as part of the message payload data. The message is then transmitted by a communications adapter (160, 161) across a fabric (128, 130) to the SLMPM executing on the accelerator (104) where the SLMPM stores the payload data, the data (176) that was transmitted, in shared memory space (158) in RAM (140) in accordance with the memory address in the message.

Direct memory access ('DMA') is a data communications protocol for passing data between a host computer and an accelerator with reduced operational burden on the computer processor (152). A DMA transfer essentially effects a copy of a block of memory from one location to another, typically from a host computer to an accelerator or vice versa. Either or both a host computer and accelerator may include DMA engine, an aggregation of computer hardware and software for direct memory access. Direct memory access includes reading and writing to memory of accelerators and host computers with reduced operational burden on their processors. A DMA engine of an accelerator, for example, may write to or read from memory allocated for DMA purposes, while the processor of the accelerator executes computer program instructions, or otherwise continues to operate. That is, a computer processor may issue an instruction to execute a DMA transfer, but the DMA engine, not the processor, carries out the transfer.

In the example of FIG. 2, only the accelerator (104) includes a DMA engine (184) while the host computer does not. In this embodiment the processor (152) on the host computer initiates a DMA transfer of data from the host to the accelerator by sending a message according to the SMT protocol to the accelerator, instructing the accelerator to perform a remote 'GET' operation. The configuration illustrated in the example of FIG. 2 in which the accelerator (104) is the only device containing a DMA engine is for explanation only, not for limitation. Readers of skill in the art will immediately recognize that in many embodiments, both a host computer and an accelerator may include a DMA engine, while in yet other embodiments only a host computer includes a DMA engine.

To implement a DMA protocol in the hybrid computing environment of FIG. 2 some memory region is allocated for access by the DMA engine (184). Allocating such memory may be carried out independently from other accelerators or host computers, or may be initiated by and completed in cooperation with another accelerator or host computer. Shared memory regions, allocated according to the SMA protocol, for example, may be memory regions made available to a DMA engine. That is, the initial setup and implementation of DMA data communications in the hybrid computing environment (100) of FIG. 2 may be carried out, at least in part, through shared memory transfers or another out-of-band data communications protocol, out-of-band with respect to a DMA engine. Allocation of memory to implement DMA transfers is relatively high in latency, but once allocated, the DMA protocol provides for high bandwidth data communications that requires less processor utilization than many other data communications protocols.

A direct 'PUT' operation is a mode of transmitting data from a memory location on an origin device to a memory location on a target device through a DMA engine. A direct 'PUT' operation allows data to be transmitted and stored on the target device with little involvement from the target device's processor. To effect minimal involvement from the target device's processor in the direct 'PUT' operation, the DMA engine transfers the data to be stored on the target device along with a specific identification of a storage location on the target device. The DMA engine knows the specific storage location on the target device because the specific storage location for storing the data on the target device has been previously provided by the target device.

A remote 'GET' operation, sometimes denominated an 'rGET,' is another mode of transmitting data from a memory location on an origin device to a memory location on a target device through a DMA engine. A remote 'GET' operation allows data to be transmitted and stored on the target device with little involvement from the origin device's processor. To effect minimal involvement from the origin device's processor in the remote 'GET' operation, the DMA engine stores the data in a storage location accessible one the target device, notifies the target device, directly or out-of-band through a shared memory transmission, of the storage location and the size of the data ready to be transmitted, and the target device retrieves the data from the storage location.

Monitoring data communications performance for a plurality of data communications modes may include monitoring a number of requests (168) in a message transmit request queue (162-165) for a data communications link (156). In the example of FIG. 2, each message transmit request queue (162-165) is associated with one particular data communications link (156). Each queue (162-165) includes entries for messages (170) that include data (176) to be transmitted by the communications adapters (160, 161) along a data communications link (156) associated with queue.

Monitoring data communications performance for a plurality of data communications modes may also include monitoring utilization of a shared memory space (158). In the example of FIG. 2, shared memory space (158) is allocated in RAM (140) of the accelerator. Utilization is the proportion of the allocated shared memory space to which data has been stored for sending to a target device and has not yet been read or received by the target device, monitored by tracking the writes and reads to and from the allocated shared memory. In the hybrid computing environment (100) of FIG. 2, shared memory space, any memory in fact, is limited. As such, a shared memory space (158) may be filled during execution of an application program (166) such that transmission of data from the host computer (110) to an accelerator may be slowed, or even stopped, due to space limitations in the shared memory space.

In some embodiments of the present invention, the hybrid computing environment (100) of FIG. 2 may be configured to operate as a parallel computing environment in which two or more instances the application program (166) executes on two or more host computers (110) in the parallel computing environment. In such embodiments, monitoring data communications performance across data communications modes may also include aggregating data communications performance information (174) across a plurality of instances of the application program (166) executing on two or more host computers in a parallel computing environment. The aggregated performance information (174) may be used to calculate average communications latencies for data communications modes, average number of requests in data communications links of a particular fabric type, average shared memory utilization among the plurality of host computers and accelerators in the parallel computing environment, and so on as will occur to those of skill in the art. Any combination of such measures may be used by the SLMPM for both determining whether to transmit the data according to requested data communications mode and selecting another data communications mode for transmitting the data if the data is not to be transmitted according to the requested data communications mode.

The SLMPM (146) of FIG. 2 functions in part by receiving, from an application program (166) on the host computer (110), a request (168) to transmit data (176) according to a data communications mode from the host computer (110) to the accelerator (104). Such data (176) may include computer program instructions compiled for execution by the accelerator (104), work piece data for an application program executing on the accelerator (104), or some combination of computer program instructions and work piece data. Receiving a request (168) to transmit data (176) according to a data communications mode may include receiving a request to transmit data by a specified fabric type, receiving a request to transmit data through a specified data communications link from the host computer to the accelerator, or receiving a request to transmit data from the host computer to the accelerator according to a protocol.

A request (168) to transmit data (176) according to a data communications mode may be implemented as a user-level application function call through an API to the SLMPM (146), a call that expressly specifies a data communications mode according to protocol, fabric type, and link. A request implemented as a function call may specify a protocol according to the operation of the function call itself. A dacs_put( ) function call, for example, may represent a call through an API exposed by an SLMPM implemented as a DACS library to transmit data in the default mode of a DMA 'PUT' operation. Such a call, from the perspective of the calling application and the programmer who wrote the calling application, represents a request to the SLMPM library to transmit data according to the default mode, known to the programmer to be default mode associated with the express API call. The called function, in this example dacs_put( ), may be coded according to embodiments of the present invention, to make its own determination whether to transmit the data according to the requested data communications mode, that is, according to the default mode of the called function. In a further example, a dacs_send( ) instruction may represent a call through an API exposed by an SLMPM implemented as a DACS library to transmit data in the default mode of an SMT 'send' operation, where the called function dacs_send( ) is again coded according to embodiments of the present invention to make its own determination whether to transmit the data according to the requested mode.

An identification of a particular accelerator in a function call may effectively specify a fabric type. Such a function call may include as a call parameters an identification of a particular accelerator. An identification of a particular accelerator by use of a PCIe ID, for example, effectively specifies a PCI fabric type. In another, similar, example, an identification of a particular accelerator by use of a media access control ('MAC') address of an Ethernet adapter effectively specifies the Ethernet fabric type. Instead of implementing the accelerator ID of the function call from an application executing on the host in such a way as to specify a fabric type, the function call may only include a globally unique identification of the particular accelerator as a parameter of the call, thereby specifying only a link from the host computer to the accelerator, not a fabric type. In this case, the function called may implement a default fabric type for use with a particular protocol. If the function called in the SLMPM is configured with PCIe as a default fabric type for use with the DMA protocol, for example, and the SLMPM receives a request to transmit data to the accelerator (104) according to the DMA protocol, a DMA PUT or DMA remote GET operation, the function called explicitly specifies the default fabric type for DMA, the PCIe fabric type.

In hybrid computing environments in which only one link of each fabric type adapts a single host computer to a single accelerator, the identification of a particular accelerator in a parameter of a function call, may also effectively specify a link. In hybrid computing environments where more than one link of each fabric type adapts a host computer and an accelerator, such as two PCIe links connecting the host computer (110) to the accelerator (104), the SLMPM function called may implement a default link for the accelerator identified in the parameter of the function call for the fabric type specified by the identification of the accelerator.

The SLMPM (146) in the example of FIG. 2 also functions in part by determining, in dependence upon the monitored performance (174), whether to transmit the data (176) according to the requested data communications mode. Determining whether to transmit the data (176) according to the requested data communications mode may include determining whether to transmit data by a requested fabric type, whether to transmit data through a requested data communications link, or whether to transmit data according to a requested protocol.

In hybrid computing environments where monitoring data communications performance across data communications modes includes monitoring a number of requests in a message transmit request queue (162-165) for a data communications link, determining whether to transmit the data (176) according to the requested data communications mode may be carried out by determining whether the number of requests in the message transmit request queue exceeds a predetermined threshold. In hybrid computing environments where monitoring data communications performance for a plurality of data communications modes includes monitoring utilization of a shared memory space, determining whether to transmit the data (176) according to the requested data communications mode may be carried out by determining whether the utilization of the shared memory space exceeds a predetermined threshold.

If the data is not to be transmitted according to the requested data communications mode, the SLMPM (146) selects, in dependence upon the monitored performance, another data communications mode for transmitting the data and transmits the data (176) according to the selected data communications mode. Selecting another data communications mode for transmitting the data may include selecting, in dependence upon the monitored performance, another data communications fabric type by which to transmit the data, selecting a data communications link through which to transmit the data, and selecting another data communications protocol. Consider as an example, that the requested data communications mode is a DMA transmission using a PUT operation through link (138) of the PCIe fabric (130) to the accelerator (104). If the monitored data performance (174) indicates that the number of requests in transmit message request queue (162) associated with the link (138) exceeds a predetermined threshold, the SLMPM may select another fabric type, the Ethernet fabric (128), and link (131, 132) through which to transmit the data (176). Also consider that the monitored performance (176) indicates that current utilization of the shared memory space (158) is less than a predetermined threshold while the number of outstanding DMA transmissions in the queue (162) exceeds a predetermined threshold. In such a case, the SLMPM (146) may also select another protocol, such as a shared memory transfer, by which to transmit the data (174).

Selecting, by the SLMPM, another data communications mode for transmitting the data (172) may also include selecting a data communications protocol (178) in dependence upon data communications message size (172). Selecting a data communications protocol (178) in dependence upon data communications message size (172) may be carried out by determining whether a size of a message exceeds a predetermined threshold. For larger messages (170), the DMA protocol may be a preferred protocol as processor utilization in making a DMA transfer of a larger message (170) is typically less than the processor utilization in making a shared memory transfer of a message of the same size.

As mentioned above, the SLMPM may also transmit the data according to the selected data communications mode. Transmit the data according to the selected data communications mode may include transmitting the data by the selected data communications fabric type, transmitting the data through the selected data communications link, or transmitting the data according to the selected protocol. The SLMPM (146) may effect a transmission of the data according to the selected data communications mode by instructing, through a device driver, the communications adapter for the data communications fabric type of the selected data communications mode to transmit the message (170) according to a protocol of the selected data communications mode, where the message includes in a message header, an identification of the accelerator, and in the message payload, the data (176) to be transmitted.

The example hybrid computing environment (100) of FIG. 2 depicts only two accelerators (104, 105) adapted to one host computer (110) for clarity of explanation, not limitation. Readers of skill in the art will recognize that host computers (110) in hybrid computing environments (100) configured for reducing remote reads of memory according to embodiments of the present invention may be adapted to many more accelerators. Hybrid computing environments according to embodiments of the present invention that include a host computer adapted to multiple accelerators may be configured to carry out one or more collective operations. A collective operation as the term is used in this specification refers to an operation, one or more computer program instructions, that is executed simultaneously, that is, at approximately the same time, by a number of accelerators adapted to a host computer at the behest of the host computer. Examples of collective operations include broadcast operations, reduction operations, allgather operations, alltoall operations, allreduce operations, scatter operations, barrier operations, and so on, as will occur to those of skill in the art.

To support execution of collective operations in the hybrid computing environment of FIG. 2, the host computer (100) is configured with local memory (159) shared remotely with the accelerators (104, 105), the shared local memory depicted in this example as shared memory space (159) of RAM (142). The accelerators (104, 105) of FIG. 2, in a similar fashion, are also configured with local memory (158) shared remotely with the host computer. The shared local memory for the accelerators is depicted in the example of FIG. 2 as a shared memory space (158) in RAM (140) of the accelerator (104). Memory local to a number of accelerators is computer memory capable of being accessed by each of the accelerators directly without use of message passing through an SLMPM (146). Such local memory may be described by contrast to shared memory space (159) on the host computer (110), where access by either accelerator (104, 105) to the shared memory space (159) requires message passing according to a DMA or SMT protocol through the SLMPM (146) adapting the accelerator to the host computer (110). In some embodiments of the present invention, the shared local memory for the accelerators may be implemented as a RAM module directly accessible by the processors (148) of each accelerator through a memory bus, where the RAM (140) module is contained within one of the accelerators, as depicted in the example of FIG. 2, or external to the accelerators.

The host computer (110) and accelerators (104, 105) in the example of FIG. 2 function generally so as to reduce remote reads of memory in the hybrid computing environment (100) in accordance with embodiments of the present invention. Each host computer (110) has local memory (159) shared remotely with the accelerators (104, 105), and each accelerator has local memory (158) shared remotely with a host computer. The shared memory (158, 159) on both the hosts and the accelerators is configured as a predefined number of individual memory segments (532, 632). Both accelerator and host run data processing application programs (166, 212) that use application memory (513, 514) for storage of values of user-level memory variables, strings, and so on. Both accelerators and the host computer maintain counters in memory, both remotely and locally, that count respecively:

the total number of packets written by the accelerator to the shared memory in the host computer (520, 524),
the total number of packets read by the host computer from the shared memory in the host computer (518, 526),
the total number of packets written by the host computer to the shared memory in the accelerator (620, 624), and
the total number of packets read by the accelerator from the shared memory in the accelerator (618, 626).

In this example, all of the counters are configured with sufficient storage capacity so as to require no resets. All of the totals stored in the counters, no doubt initialized to zero at some point in the past such as, for example, at the time when the hybrid computing environment was first powered on, accumulate continuously, always reflecting the entire history of reads and writes to and from shared memory on the host computers and the accumulators, from the time when the hybrid computing environment was first powered on until the present.

Host computers and accelerators may reduce remote reads according to embodiments of the present invention by maintaining all remote memory values locally or maintaining a subset of remote memory values locally. In some embodiments, where all remote memory values are maintained locally, an SLMPM can be configured to track all changes in memory values in application memory. In other embodiments, an SLMPM is configured with information indicating a subset of memory values in application memory to be tracked and maintained locally and remotely. In the example of FIG. 2, the application programs and the operating systems are configured to notify the SLMPMs through their memory access functions of changes in application memory values. Memory access functions include any data processing function that affects a memory value, writes, puts, moves, and so on. In this example, memory access functions of an accelerator (104) notify an SLMPM (146) of changes in accelerator application memory values (514), and memory access functions of a host computer (110) notify an SLMPM (146) of changes in host computer application memory values (513).

When one or more memory values in accelerator application memory (514) changes, an accelerator (104) writes through an SLMPM (146) to the shared memory (159, 532) of its associated host computer (110), beginning at a next available memory segment, one or more packets of data representing the changes in accelerator memory values. The accelerator then increments, in both local shadow memory (520) on the accelerator and also in remote shared memory (524) on the host computer, a counter value representing the total number of packets written by the accelerator to the shared memory in the host computer. The local counter value is referred to as a 'shadow' value because it effectively shadows or tracks the counter value written remotely. The host computer (110), having received data packets, reads, from the shared memory (159, 532) in the host computer beginning with a next unread memory segment, the packets of data written by the accelerator to the shared memory in the host computer. The host's reading of the written data is carried out asynchronously with respect to the writing by the accelerator. Having read the data, the host computer then moves the read data to application memory (513) of the host computer and increments, in both local shadow memory (526) on the host computer and in remote shared memory (518) on the accelerator, a counter value representing the total number of packets read by the host computer from the shared memory in the host computer. Moving the read data to application memory effectively maintains as local memory values that are in fact administered or affected remotely. From the point of view of the host computer in this example, every remote data value of interest is always available by a local read of local application memory, with little or no need for remote reads. In fact, if all remote values of interest to the host computer are maintained locally in this manner, the host computer will never be required to execute a remote read.

The reduction of remote reads of memory in the example of FIG. 2 is effectively bi-directional. When one or more memory values in a host computer's application memory (513) changes, the host computer (110) writes through an SLMPM (146) to the shared memory (158, 632) of the accelerator beginning at a next available memory segment, one or more packets of data representing the changes in host computer memory values. The host computer (110) then increments, in both local shadow memory (620) on the host computer and also in remote shared memory (624) on the accelerator, a counter value representing the total number of packets written by the host computer to the shared memory in the accelerator. The accelerator (104), having received data packets, reads, from the shared memory (158, 632) in the accelerator beginning with a next unread memory segment, the packets of data written by the host computer to the shared memory in the accelerator. The accelerator's reading of the written data is carried out asynchronously with respect to the writing by the host computer. Having read the data, the accelerator (104) then moves the read data to application memory (514) of the accelerator and increments, in both local shadow memory (626) on the accelerator and also in remote shared memory (618) on the host computer, a counter value representing the total number of packets read by the accelerator from the shared memory in the accelerator.

A host computer can increment a counter value representing the total number of packets read by the host computer from the shared memory in the host computer by incrementing the counter value in both places upon every such read. As an alternative, however, the host computer (110) can increment a counter value (526) representing the total number of packets read by the host computer from the shared memory in the host computer by incrementing the counter value in local shadow memory in the host computer every time the host computer reads packets of data from the shared memory in the host computer and incrementing the counter value (518) in remote shared memory on the accelerator only when the number of unread memory segments in the shared memory in the host computer reaches a predetermined unread memory threshold. Similarly, an accelerator (104) can increment a counter value (626) representing the total number of packets read by the accelerator from the shared memory in the accelerator by incrementing the counter value in local shadow memory in the accelerator every time the accelerator reads packets of data from the shared memory in the accelerator and incrementing the counter value (618) in remote shared memory on the host computer only when the number of unread memory segments in the shared memory in the accelerator reaches a predetermined unread memory threshold.

Each accelerator in the example of FIG. 2 is configured to determine, using only counter values (518, 520) stored in local memory on the accelerator, a number of unread memory segments in the shared memory of the host computer in dependence upon the total number of packets written by the accelerator to the shared memory in the host computer and the total number of packets read by the host computer from the shared memory in the host computer. The accelerators can make such a determination by calculating the number of unread memory segments in the shared memory (159) of the host computer by subtracting from the total number of packets written (520) by the accelerator to the shared memory in the host computer the total number of packets read (518) by the host computer from the shared memory in the host computer. Making this determination of the number of unread memory segments in the shared memory (159) of the host computer using only counter values (518, 520) stored in local memory on the accelerator means that the determination is made with no remote reads of memory.

Each accelerator in the example of FIG. 2 is further configured to determine, using only counter values stored in local memory on the accelerator, a number of memory segments in the shared memory of the host computer available to receive data packets in dependence upon the predetermined number of individual memory segments (532) in the shared memory of the host computer and the number of unread memory segments in the shared memory of the host computer. The accelerators can make such a determination by calculating the number of memory segments in the shared memory of the host computer available to receive data packets by subtracting from the predetermined number of individual memory segments in the shared memory of the host computer the number of unread memory segments in the shared memory of the host computer. The number of memory segments in the shared memory of the host computer is configured into the accelerators as a local operating parameter, stored in local memory on each accelerator, not shown in FIG. 2. The number of unread memory segments in the shared memory of the host computer is calculated as described just above, and, again, making this determination of the number of memory segments in the shared memory of the host computer available to receive data packets using only counter values (518, 520) stored in local memory on the accelerator means that the determination is made with no remote reads of memory.

Each accelerator in the example of FIG. 2 is further configured to identify the next available memory segment in the shared memory of the host computer, that is, where in the shared memory of the host computer to start writing, according to (J+1) modulo N, where J is the total number of packets written by the accelerator to the shared memory of the host computer and N is the predetermined number of individual memory segments. As mentioned above, the counter values (520, 524) representing the total number of packets written by an accelerator to the shared memory of a host computer are always increasing, no wraps, no resets, so that their values become arbitrarily large with respect to N. (J+1) modulo N, however, is always a value between 0 and N−1, always indicating the next memory segment in the shared memory of a host computer that is available to receive packets of data from an accelerator.

Each host computer (110) in the example of FIG. 2 is configured to determine, using only counter values (524, 526) stored in local memory on the host computer, the number of unread memory segments in the shared memory of the host computer in dependence upon the total number of packets written (524) by the accelerator to the shared memory in the host computer and the total number of packets read (526) by the host computer from the shared memory in the host computer. A host computer can make this determination by calculating the number of unread memory segments in the shared memory of the host computer by subtracting from the total number of packets written (524) by the accelerator to the shared memory in the host computer the total number of packets read (526) by the host computer from the shared memory in the host computer. Each host computer in this example is also configured to identify the next unread memory segment according to (K+1) modulo N, where K is the total number of packets read by the host computer from the shared memory in the host computer and N is the predetermined number of individual memory segments in the shared memory of the host computer. Having so identified the next unread memory segment, a host computer then reads from the shared memory in the host computer by reading unread data from the determined number of unread memory memory segments beginning with the identified next unread memory segment. These reads are local reads by the host computer from shared local memory (159, 532) on the host computer.

As mentioned above, having read the data, the host computer then moves the read data to application memory (513) of the host computer. Moving the read data to application memory effectively maintains as local memory values that are in fact administered or affected remotely. Readers will recognize that this is a variance of the general use as described above of shared memory such that only one instance of any particular item of data necessarily resides in memory at any particular time—because data values used to reduce remote reads according to embodiments of the present invention typically reside in memory in at least two places, both in application memory (514) of an accelerator and also in application memory (513) of a host computer. And this dual storage of memory values used to reduce remote reads presists according to embodiments of the present invention regardless whether the accelerator or the host functions as local or remote.

Figure 3:
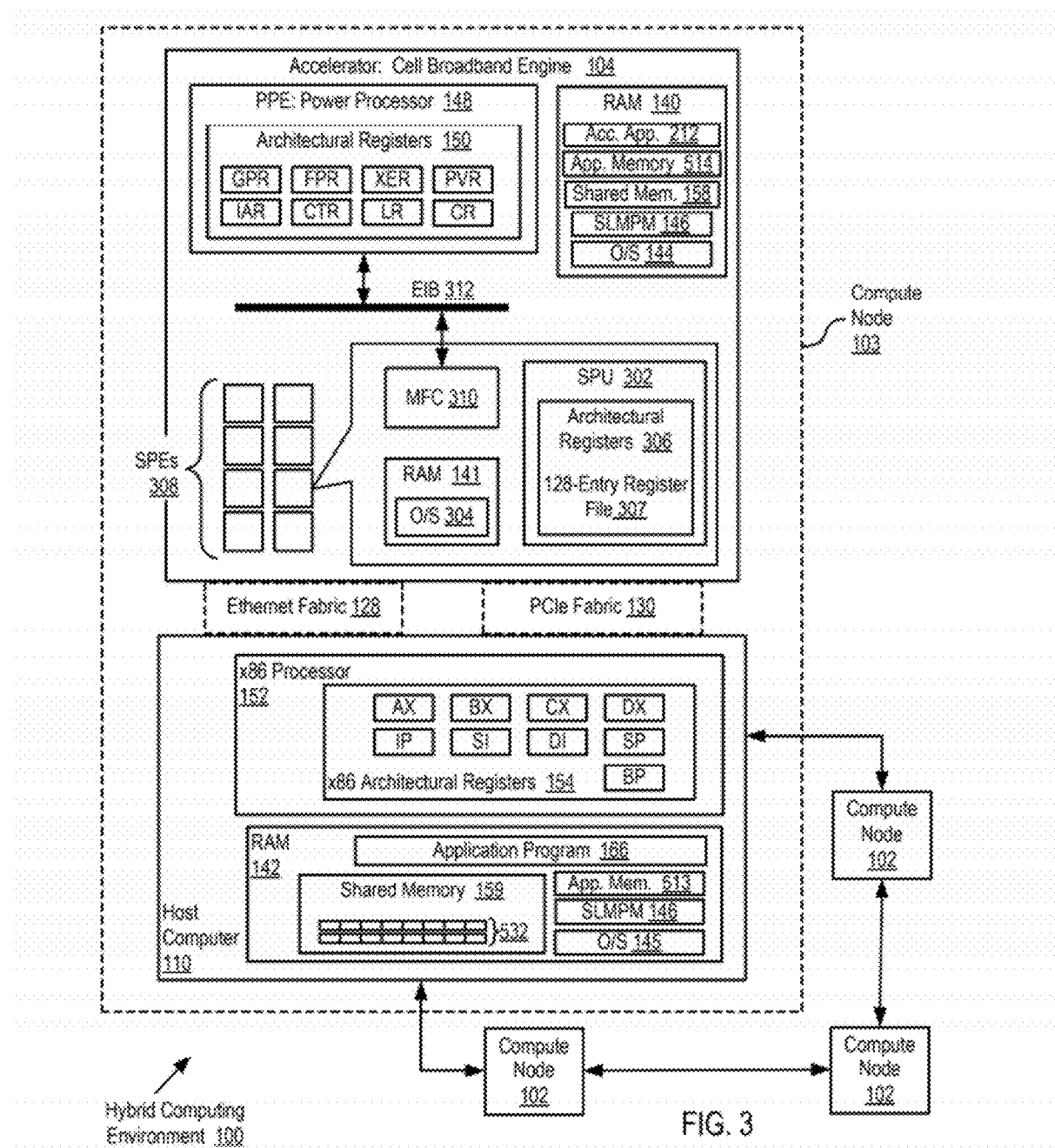

For further explanation, FIG. 3 sets forth a block diagram of a further example hybrid computing environment (100) that reduces remote reads of memory by maintaining remote memory values locally according to embodiments of the present invention. The hybrid computing environment of FIG. 3 is similar the hybrid computing environment of FIG. 2, including as it does, four compute nodes (102, 103), each of which includes a host computer (110) having a host computer architecture and an accelerator (104) having an accelerator architecture where the accelerator architecture is optimized, with respect to the host computer architecture, for speed of execution of a particular class of computing functions. The host computer (110) and the accelerator (104) are adapted to one another for data communications by a system level message passing module (146) and two or more data communications fabrics (128, 130) of at least two different fabric types. In the example of FIG. 3, the host computer (110) is adapted to accelerator (104) by an Ethernet fabric (128) and a PCIe fabric (130).

The host computer (110) as illustrated in the expanded view of the compute node (103) includes an x86 processor. An x86 processor is a processor whose architecture is based upon the architectural register set of the Intel x86 series of microprocessors, the 386, the 486, the 586 or Pentium™, and so on. Examples of x86 processors include the Advanced Micro Devices ('AMD') Opteron™, the AMD Phenom™, the AMD Athlon XP™, the AMD Athlon 64™, Intel Nehalam ™, Intel Pentium 4, Intel Core 2 Duo, Intel Atom, and so on as will occur to those of skill in the art. The x86 processor (152) in the example of Figure illustrates a set of a typical architectural registers (154) found in many x86 processors including, for example, an accumulator register ('AX'), a base register ('BX'), a counter register ('CX'), a data register (DX), a source index register for string operations ('SI'), a destination index for string operations('DI'), a stack pointer ('SP'), a stack base pointer for holding the address of the current stack frame ('BP'), and an instruction pointer that holds the current instruction address ('IP').

The accelerator (104) in the example of FIG. 3 is illustrated as a Cell Broadband Engine ('CBE') having a Cell Broadband Engine Architecture ('CBEA'). A CBEA is a microprocessor architecture jointly developed by Sony Computer Entertainment, Toshiba, and IBM, an alliance known as "STI." Microprocessors implemented according to the CBEA are sometimes referred to as 'Cell' processors or simply as CBEs. The CBEA combines a general-purpose POWER architecture core, a Power Processing Element ('PPE') (148), of modest performance with streamlined co-processing elements, called Synergistic Processing Elements ('SPEs') (308) which greatly accelerate multimedia and vector processing applications, as well as many other forms of dedicated computation. The CBE architecture emphasizes efficiency/watt, prioritizes bandwidth over latency, and favors peak computational throughput over simplicity of program code.

The accelerator (104) of FIG. 3, implemented as a CBE, includes a main processor (148) that in this example is a Power Processing Element ('PPE'), eight fully-functional co-processors called SPEs (308), and a high-bandwidth circular data bus connecting the PPE and the SPEs, called the Element Interconnect Bus ('EIB') (312). The PPE (148) is a POWER architecture processor with a two-way multi-threaded core acting as a controller for the eight SPEs (308). The term "POWER architecture" here refers to IBM's different generations of processor architectures, a broad term including all products based on POWER, PowerPC and Cell architectures. The architectural registers (150) of the PPE (148) of the CBE accelerator (104) therefore are different from those of the x86 processor (152) of the host computer (110). The PPE (148) of FIG. 3 includes an example set of architectural registers (150) of the POWER architecture, including 32 general purpose registers ('GPRs'), 32 floating point registers ('FPRs'), a fixed-point exception register ('XER'), a count register ('CTR'), a Condition register ('CR'), an instruction address register ('IAR'), a link register ('LR'), and a processor version register ('PVR').

The SPEs (308) handle most of the computational workload of the CBE (104). While the SPEs are optimized for vectorized floating point code execution, the SPEs also may execute operating systems, such as, for example, a light-weight, modified version of Linux with the operating system stored in local memory (141) on the SPE. Each SPE (308) in the example of FIG. 3 includes a Synergistic Processing Unit ('SPU') (302), and a Memory Flow Controller ('MFC') (310). An SPU (302) is a Reduced Instruction Set Computing ('RISC') processor with 128-bit single instruction, multiple data ('SIMD') organization for single and double precision instructions. In some implementations, an SPU may contain a 256 KB embedded Static RAM (141) for instructions and data, called local storage which is visible to the PPE (148) and can be addressed directly by software. Each SPU (302) can support up to 4 Gigabyte ('GB') of local store memory. The local store does not operate like a conventional CPU cache because the local store is neither transparent to software nor does it contain hardware structures that predict which data to load. The SPUs (302) also implement architectural registers (306) different from those of the PPE which include a 128-bit, 128-entry register file (307). An SPU (302) can operate on 16 8-bit integers, 8 16-bit integers, 4 32-bit integers, or 4 single precision floating-point numbers in a single clock cycle, as well as execute a memory operation.

The MFC (310) integrates the SPUs (302) in the CBE (104). The MFC (310) provides an SPU with data transfer and synchronization capabilities, and implements the SPU interface to the EIB (312) which serves as the transportation hub for the CBE (104). The MFC (310) also implements the communication interface between the SPE (308) and PPE (148), and serves as a data transfer engine that performs bulk data transfers between the local storage (141) of an SPU (302) and CBE system memory, RAM (140), through DMA. By offloading data transfer from the SPUs (302) onto dedicated data transfer engines, data processing and data transfer proceeds in parallel, supporting advanced programming methods such as software pipelining and double buffering. Providing the ability to perform high performance data transfer asynchronously and in parallel with data processing on the PPE (148) and SPEs (302), the MFC (310) eliminates the need to explicitly interleave data processing and transfer at the application level.

The SLMPM (146) in the example of FIG. 3 processes data in the hybrid computing environment (100) according to embodiments of the present invention by monitoring data communications performance for a plurality of data communications modes between the host computer (110) and the accelerator (104); receiving, from an application program (166) on the host computer (110), a request to transmit data according to a data communications mode from the host computer (110) to the accelerator (104); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The hybrid computing environment (100) in the example of FIG. 3 includes only one accelerator (104) adapted to a host computer (110) for clarity of explanation, not limitation. As mentioned above, hybrid computing environments (100) configured for reducing remote reads of memory by maintaining remote memory values locally according to embodiments of the present invention may include any number of accelerators (104) adapted to a host computer (110). The example hybrid computing environment (100) of FIG. 3 is configured for reducing remote reads of memory by maintaining remote memory values locally in accordance with embodiments of the present invention. Each host computer in this example has local memory (142) some portion of which is shared (159) remotely with accelerators, and each accelerator has local memory (140) some portion of which is shared (158) remotely with a host computer. The shared memory (158, 159) on both the host and the accelerators is each configured as a predefined number of individual memory segments. The hybrid computing environment in this example reduces remote reads of memory as follows. When one or more memory values in accelerator application memory (514) changes, the accelerator (104) writes through the SLMPM (146) to the shared memory (159, 532) of the host computer (110) beginning at a next available memory segment, one or more packets of data representing the changes in accelerator memory values. The accelerator then increments, in both local shadow memory (140) on the accelerator and also in remote shared memory (159) on the host computer, a counter value representing the total number of packets written by the accelerator to the shared memory in the host computer. The host computer (110), having received data packets, reads, from the shared memory (159, 532) in the host computer beginning with a next unread memory segment, the packets of data written by the accelerator to the shared memory in the host computer. The host's reading of the written data is carried out asynchronously with respect to the writing by the accelerator. Having read the data, the host computer then moves the read data to application memory (513) of the host computer and increments, in both local shadow memory (142) on the host computer and in remote shared memory (158) on the accelerator, a counter value representing the total number of packets read by the host computer from the shared memory in the host computer.

The function of reducing remote reads of memory in the example of FIG. 3 is effectively bi-directional. When one or more memory values in a host computer's application memory (513) changes, the host computer (110) writes through the SLMPM (146) to the shared memory (158) of the accelerator beginning at a next available memory segment, one or more packets of data representing the changes in host computer memory values. The host computer (110) then increments, in both local shadow memory (142) on the host computer and also in remote shared memory (158) on the accelerator, a counter value representing the total number of packets written by the host computer to the shared memory in the accelerator. The accelerator (104), having received data packets, reads, from the shared memory (158) in the accelerator beginning with a next unread memory segment, the packets of data written by the host computer to the shared memory in the accelerator. The accelerator's reading of the written data is carried out asynchronously with respect to the writing by the host computer. Having read the data, the accelerator (104) then moves the read data to application memory (514) of the accelerator and increments, in both local shadow memory (140) on the accelerator and also in remote shared memory (159) on the host computer, a counter value representing the total number of packets read by the accelerator from the shared memory in the accelerator.

Figure 4:
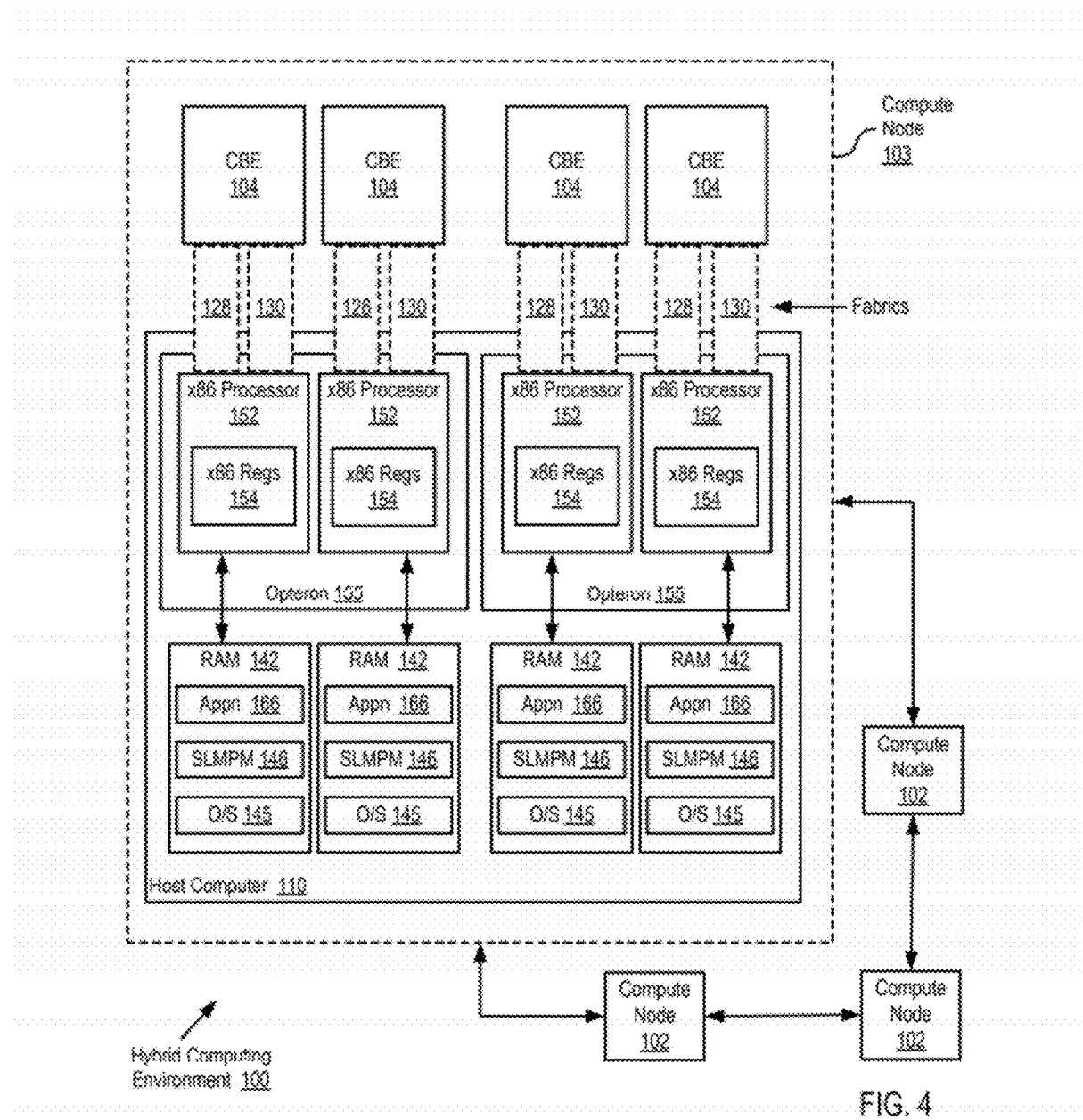

For further explanation, FIG. 4 sets forth a block diagram of a further example hybrid computing environment (100) that reduces remote reads of memory by maintaining remote memory values locally according to embodiments of the present invention. The hybrid computing environment of FIG. 4 is similar the hybrid computing environment of FIG. 2, including as it does, four compute nodes (102, 103), each of which includes a host computer (110) having a host computer architecture and one or more accelerators (104) each having an accelerator architecture where the accelerator architecture is optimized, with respect to the host computer architecture, for speed of execution of a particular class of computing functions. The host computer (110) and the accelerator (104) in the example of FIG. 4 are adapted to one another for data communications by a system level message passing module (146) and two or more data communications fabrics (128, 130) of at least two different fabric types. In the example of FIG. 4, the host computer (110) is adapted to accelerator (104) by an Ethernet fabric (128) and a PCIe fabric (130).

FIG. 4 illustrates an example of a hybrid computing environment similar to that implemented in the LANL supercomputer. The host computer (110), as illustrated by the expanded view of the compute node (103), implemented in the LANL supercomputer includes two AMD Opteron processors (155), each of which is a dual-core processor. Each of the cores (152) of the host computer (110) is illustrated in the example of FIG. 4 as a single, fully functional x86 processor core with each core having its own set of architectural registers (154). Each of the processor cores (152) in the example of FIG. 4 is operatively coupled to RAM (142) where an instance of an application program (166), an instance of the SLMPM (146), and an operating system (145) is stored. In the example of the LANL supercomputer, the SLMPM (146) is the Data Communication and Synchronization ('DACS') library improved according to embodiments of the present invention.

Each x86 processor core (152) in the example of FIG. 4 is adapted through an Ethernet (128) and PCIe (130) fabric to a separate accelerator (104) implemented as a CBE as described above with respect to FIG. 3. Each core (152) of each AMD Opteron processor (155) in the host computer (110) in this example is connected to at least one CBE. Although in this example the ratio of cores of the Opteron processors to CBEs (104) is one-to-one, readers of skill in the art will recognize that other example embodiments may implement different ratios of processor cores to accelerators such as, for example, one-to-two, one-to-three, and so on.

Each instance of the SLMPM (146) executing on each x86 processor core (152) in the example of FIG. 4 processes data in the hybrid computing environment (100) according to embodiments of the present invention by monitoring data communications performance across data communications modes between the host computer (110) and the accelerator (104) connected to the processor core (152); receiving, from the instance of the application program (166) executing on the processor core (152) of the host computer (110), a request to transmit data according to a data communications mode from the host computer (110) to the accelerator (104) connected to the processor core (152); determining, in dependence upon the monitored performance, whether to transmit the data according to the requested data communications mode; and if the data is not to be transmitted according to the requested data communications mode: selecting, in dependence upon the monitored performance, another data communications mode for transmitting the data and transmitting the data according to the selected data communications mode.

The example hybrid computing environment (100) of FIG. 4 also may be configured as described above for reducing remote reads of memory by maintaining remote memory values locally in accordance with embodiments of the present invention. Each host computer (110) can have some portion of its local memory shared remotely with accelerators (104), and each accelerator can have some portion of its local memory shared remotely with a host computer. The shared memory on both the host and the accelerators is to be configured as a predefined number of individual memory segments. The hybrid computing environment in this example then can be configured to reduces remote reads of memory as follows. When one or more memory values in accelerator application memory changes, the accelerator writes through an SLMPM (146) to the shared memory of the host computer (110) beginning at a next available memory segment, one or more packets of data representing the changes in accelerator memory values. The accelerator then increments, in both local shadow memory on the accelerator and also in remote shared memory on the host computer, a counter value representing the total number of packets written by the accelerator to the shared memory in the host computer. The host computer, having received data packets, reads, from the shared memory in the host computer beginning with a next unread memory segment, the packets of data written by the accelerator to the shared memory in the host computer. The host's reading of the written data is carried out asynchronously with respect to the writing by the accelerator. Having read the data, the host computer then moves the read data to application memory of the host computer and increments, in both local shadow memory on the host computer and in remote shared memory on the accelerator, a counter value representing the total number of packets read by the host computer from the shared memory in the host computer. Just as the functionality described above in this paragraph reduces remote reads of memory on an accelerator by maintaining remote data values from the accelerator locally on a host computer, so also the functionality can be adapted bi-directionally to also reduce remote reads of memory on a host computer by maintaining remote data values from the host computer locally on an accelerator.

Figure 5:
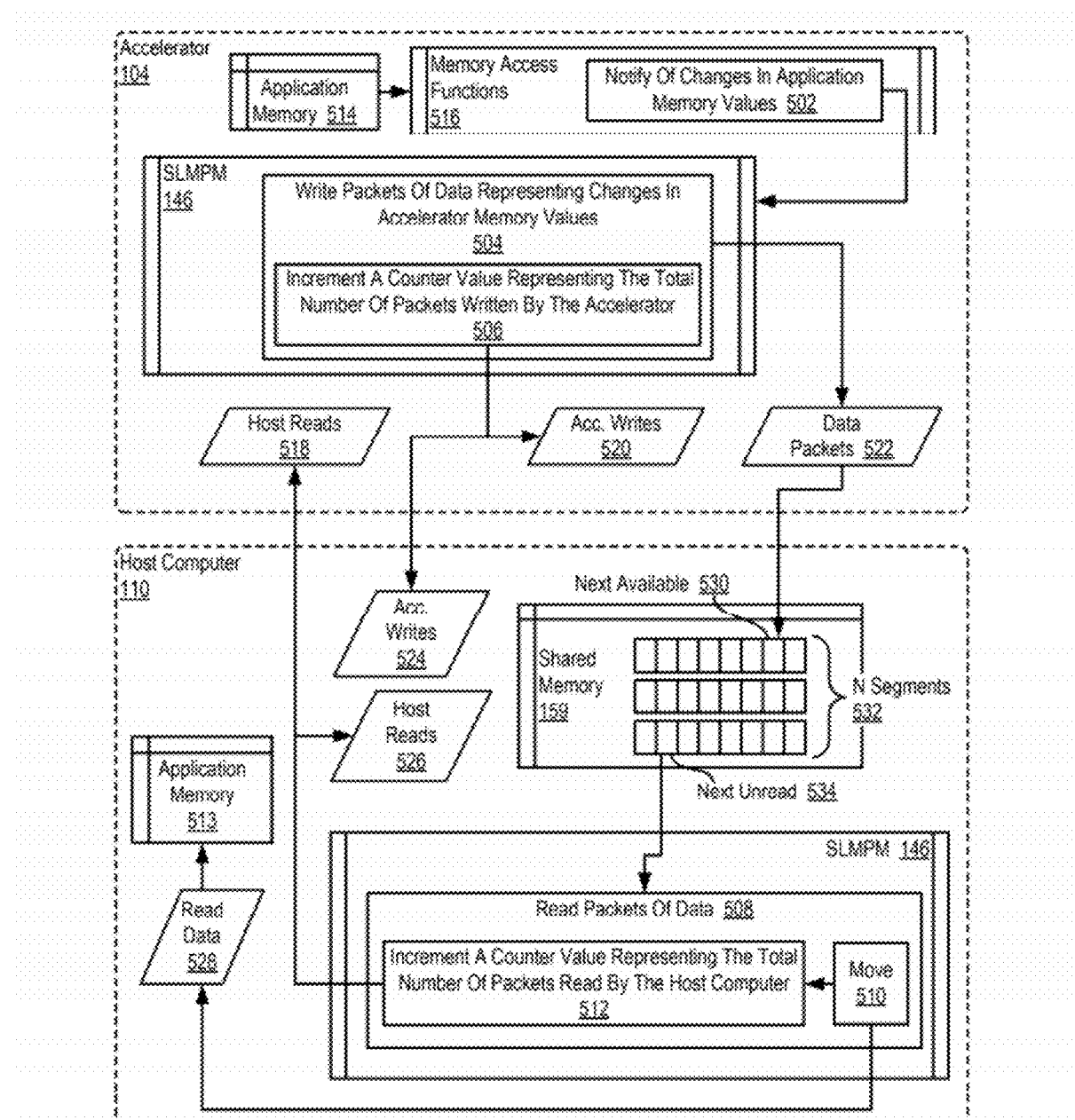
FIGS. 5-10 set forth flow charts illustrating example methods of reducing remote reads of memory in a hybrid computing environment by maintaining remote memory values locally according to embodiments of the present invention.

For further explanation, FIG. 5 sets forth a flow chart illustrating an example method of reducing remote reads of memory in a hybrid computing environment by maintaining remote memory values locally according to embodiments of the present invention. The method of FIG. 5 is implemented in and upon a hybrid computing environment similar to the hybrid computing environments described above in this specification with regard to FIGS. 1-4. Such a hybrid computing environment includes a host computer (110) having a host computer architecture and a number of accelerators (104) having an accelerator architecture, the accelerator architecture optimized, with respect to the host computer architecture, for speed of execution of a particular class of computing functions, the host computer (110) and the accelerators (104) adapted to one another for data communications by an SLMPM (146) and, optionally, by two or more data communications fabrics (128, 130 on FIG. 2) of at least two different fabric types. The host computer has local memory (159) shared remotely with the accelerators, and each accelerator has local memory (158 on FIG. 2) shared remotely with the host computer. The shared memory on both the host and the accelerators are each configured as a predefined number of individual memory segments (532).

The method of FIG. 5 includes notifying (502), by memory access functions (516) of the accelerator (104), the SLMPM (146) of changes in accelerator application memory values (514). The method of FIG. 5 also includes writing (504) by an accelerator when one or more memory values in accelerator application memory change, through the SLMPM to the shared memory (159) of the host computer beginning at a next available memory segment (530), one or more packets of data (522) representing the changes in accelerator memory values. In this example, writing (504) the data packets further includes incrementing, in both local shadow memory (520) on the accelerator and in remote shared memory (524) on the host computer, a counter value representing the total number of packets written by the accelerator to the shared memory in the host computer.

The method of FIG. 5 also includes reading (508) by the host computer, from the shared memory (159) in the host computer beginning with a next unread memory segment (534), the packets of data (522) written by the accelerator to the shared memory in the host computer. In the method of FIG. 5, the reading (508) of the data packets is carried out asynchronously with respect to the writing (504). In the method of FIG. 5, the reading (508) of the data packets further includes moving (510) the read data (528) to application memory (513) of the host computer and incrementing (512), in both local shadow memory (526) on the host computer and in remote shared memory (518) on the accelerator, a counter value representing the total number of packets read by the host computer from the shared memory in the host computer.

Figure 6:
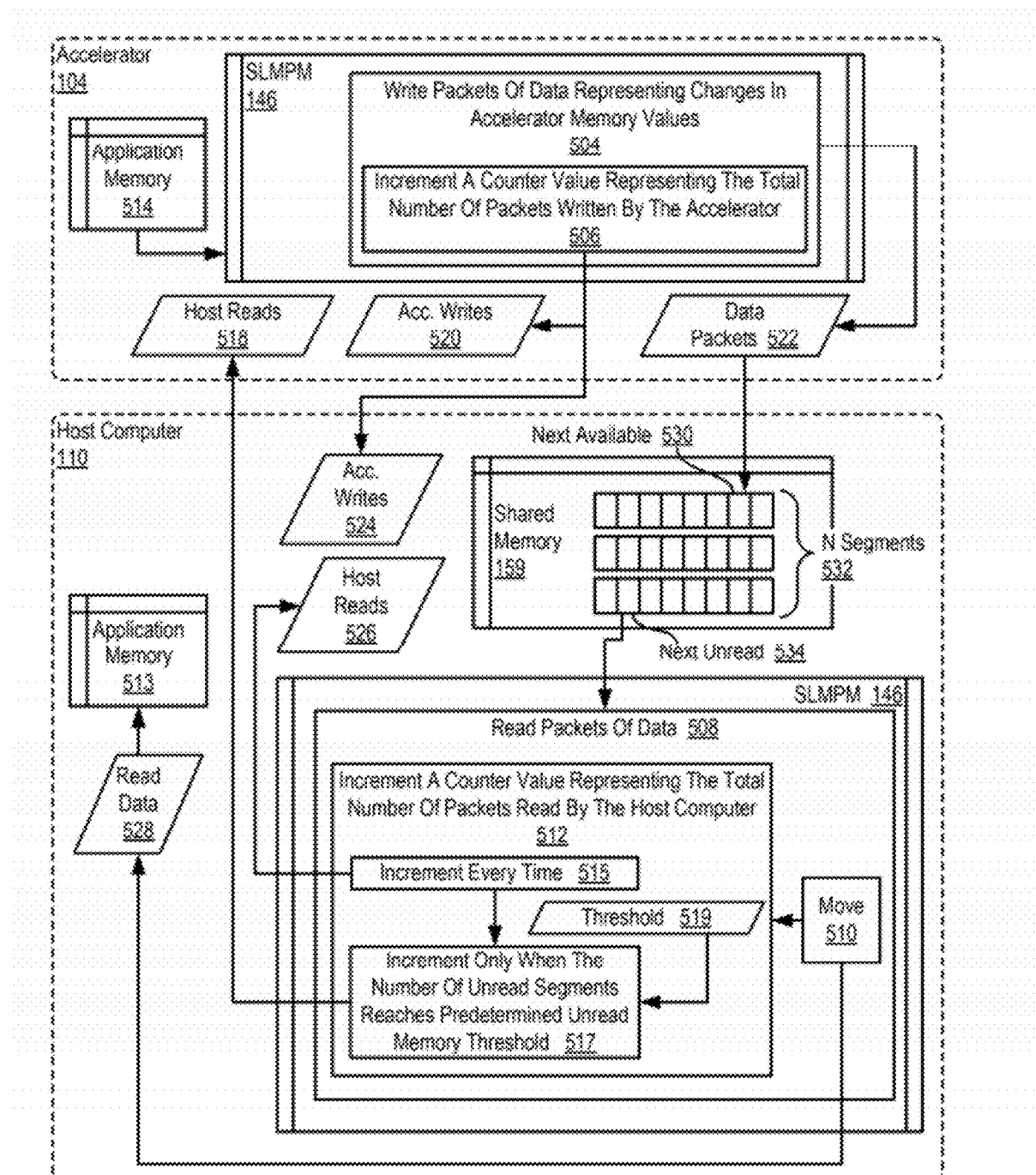

For further explanation, FIG. 6 sets forth a flow chart illustrating a further example method of reducing remote reads of memory in a hybrid computing environment by maintaining remote memory values locally according to embodiments of the present invention. The method of FIG. 6 is implemented in and upon a hybrid computing environment similar to the hybrid computing environments described above in this specification with regard to FIGS. 1-4. Such a hybrid computing environment includes a host computer (110) having a host computer architecture and a number of accelerators (104) having an accelerator architecture, the accelerator architecture optimized, with respect to the host computer architecture, for speed of execution of a particular class of computing functions, the host computer (110) and the accelerators (104) adapted to one another for data communications by an SLMPM (146) and, optionally, by two or more data communications fabrics (128, 130 on FIG. 2) of at least two different fabric types. The host computer has local memory (159) shared remotely with the accelerators, and each accelerator has local memory (158 on FIG. 2) shared remotely with the host computer. The shared memory on both the host and the accelerators are each configured as a predefined number of individual memory segments (532). The method of FIG. 6 is similar to the method of FIG. 5, including as it does writing (504) by an accelerator to the shared memory (159, 532) of the host computer packets of data (522) representing changes in accelerator memory values (514), incrementing (506) a counter value (520, 524) representing the total number of packets written by the accelerator to the shared memory in the host computer, asynchronously reading (508) by the host computer the packets of data (522) written by the accelerator to the shared memory in the host computer, moving (510) the read data (528) to application memory (513) of the host computer, and incrementing (512) a counter value (518, 526) representing the total number of packets read by the host computer from the shared memory in the host computer.

In the method of FIG. 6, however, incrementing (512) a counter value representing the total number of packets read by the host computer from the shared memory in the host computer includes incrementing (515) the counter value (526) in local shadow memory in the host computer every time the host computer reads packets of data from the shared memory in the host computer and incrementing (517) the counter value (518) in remote shared memory on the accelerator only when the number of unread memory segments in the shared memory in the host computer reaches a predetermined unread memory threshold (519). The threshold can be expressed as a proportion of fullness, so that, for example, when the number of unread memory segments in the shared memory of the host computer indicates that one third, one half, or two thirds, or any proportion as may occur to those of skill in the art, of the memory segments in the shared memory of the host computer are occupied by unread data packets, then the host computer increments the counter value (518) in remote shared memory on the accelerator representing the total number of packets read by the host computer from the shared memory in the host computer. This procedure has the benefit of reducing the number of remote writes of the counter value (518) in remote shared memory on the accelerator and results in a harmless temporary inaccuracy in the counter value (518) in remote shared memory on the accelerator.

Figure 7:
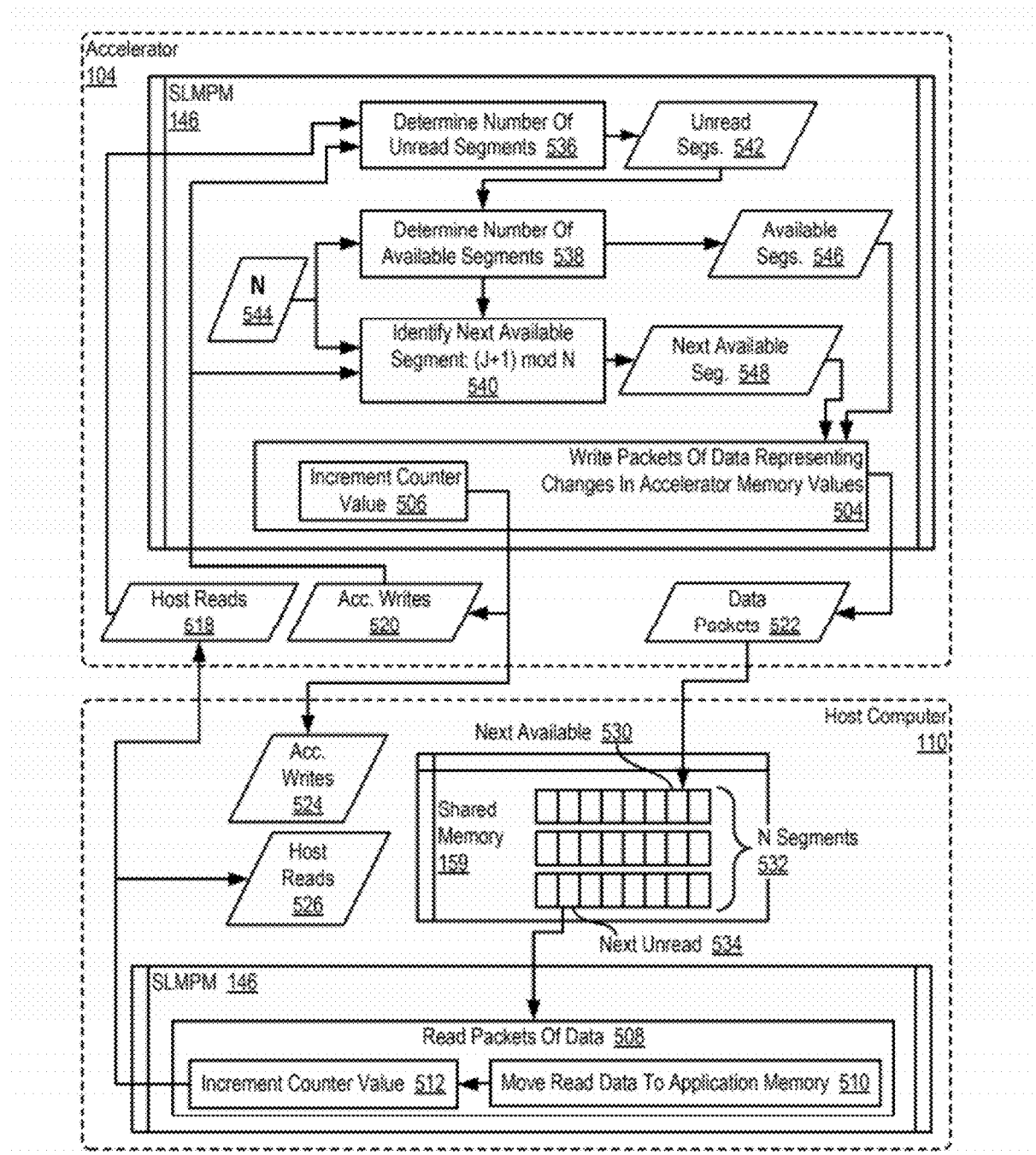

For further explanation, FIG. 7 sets forth a flow chart illustrating a further example method of reducing remote reads of memory in a hybrid computing environment by maintaining remote memory values locally according to embodiments of the present invention. The method of FIG. 7 is implemented in and upon a hybrid computing environment similar to the hybrid computing environments described above in this specification with regard to FIGS. 1-4. Such a hybrid computing environment includes a host computer (110) having a host computer architecture and a number of accelerators (104) having an accelerator architecture, the accelerator architecture optimized, with respect to the host computer architecture, for speed of execution of a particular class of computing functions, the host computer (110) and the accelerators (104) adapted to one another for data communications by an SLMPM (146) and, optionally, by two or more data communications fabrics (128, 130 on FIG. 2) of at least two different fabric types. The host computer has local memory (159) shared remotely with the accelerators, and each accelerator has local memory (158 on FIG. 2) shared remotely with the host computer. The shared memory on both the host and the accelerators are each configured as a predefined number of individual memory segments (532). The method of FIG. 7 is similar to the method of FIG. 5, including as it does writing (504) by an accelerator to the shared memory (159, 532) of the host computer packets of data (522) representing changes in accelerator memory values (514), incrementing (506) a counter value (520, 524) representing the total number of packets written by the accelerator to the shared memory in the host computer, asynchronously reading (508) by the host computer the packets of data (522) written by the accelerator to the shared memory in the host computer, moving (510) the read data (528) to application memory (513) of the host computer, and incrementing (512) a counter value (518, 526) representing the total number of packets read by the host computer from the shared memory in the host computer.

The method of FIG. 7, however, also includes determining (536) by the accelerator (104), using only counter values (518, 520) stored in local memory on the accelerator, the number of unread memory segments (542) in the shared memory (532) of the host computer in dependence upon the total number of packets written (520) by the accelerator to the shared memory in the host computer and the total number of packets read (518) by the host computer from the shared memory in the host computer. The accelerator can make this determination, calculating the number of unread memory segments in the shared memory of the host computer, by subtracting from the total number of packets written (520) by the accelerator to the shared memory in the host computer the total number of packets read (518) by the host computer from the shared memory in the host computer.

The method of FIG. 7 also includes determining (538) by the accelerator, using only counter values (518, 520) stored in local memory on the accelerator, a number of memory segments (546) in the shared memory of the host computer available to receive data packets in dependence upon the predetermined number N (544) of individual memory segments in the shared memory of the host computer and the number of unread memory segments (542) in the shared memory of the host computer. The accelerator can make this determination, calculating the number of memory segments (546) in the shared memory of the host computer available to receive data packets, by subtracting from the predetermined number of individual memory segments in the shared memory of the host computer, here represented as N (544), the number of unread memory segments in the shared memory of the host computer (542)—calculated as described just above by subtracting from the total number of packets written (520) by the accelerator to the shared memory in the host computer the total number of packets read (518) by the host computer from the shared memory in the host computer.

The method of FIG. 7 also includes identifying (540) by the accelerator the next available memory segment (548) in the shared memory of the host computer that is available to receive data packets according to (J+1) modulo N, where J is the total number of packets written by the accelerator to the shared memory of the host computer and N is the predetermined number of individual memory segments. Then in this example, writing (504) packets of data representing changes in accelerator memory value can be carried out by writing the packets of data (522) to the number of memory segments (546) so determined to be available to receive data packets beginning with the next memory segment so identified as available to receive data packets.

Figure 8:
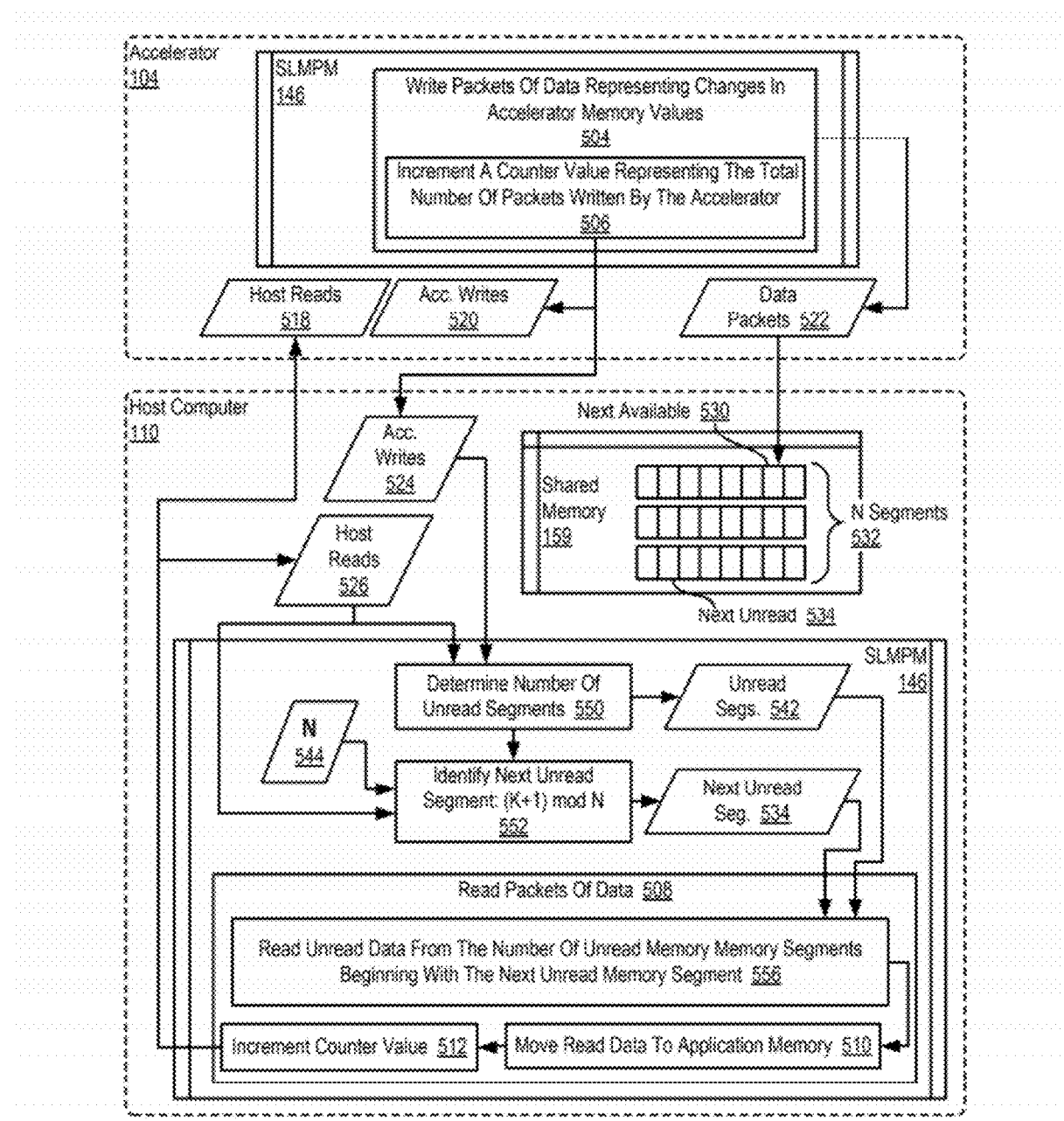

For further explanation, FIG. 8 sets forth a flow chart illustrating a further example method of reducing remote reads of memory in a hybrid computing environment by maintaining remote memory values locally according to embodiments of the present invention. The method of FIG. 8 is implemented in and upon a hybrid computing environment similar to the hybrid computing environments described above in this specification with regard to FIGS. 1-4. Such a hybrid computing environment includes a host computer (110) having a host computer architecture and a number of accelerators (104) having an accelerator architecture, the accelerator architecture optimized, with respect to the host computer architecture, for speed of execution of a particular class of computing functions, the host computer (110) and the accelerators (104) adapted to one another for data communications by an SLMPM (146) and, optionally, by two or more data communications fabrics (128, 130 on FIG. 2) of at least two different fabric types. The host computer has local memory (159) shared remotely with the accelerators, and each accelerator has local memory (158 on FIG. 2) shared remotely with the host computer. The shared memory on both the host and the accelerators are each configured as a predefined number of individual memory segments (532). The method of FIG. 8 is similar to the method of FIG. 5, including as it does writing (504) by an accelerator to the shared memory (159, 532) of the host computer packets of data (522) representing changes in accelerator memory values (514), incrementing (506) a counter value (520, 524) representing the total number of packets written by the accelerator to the shared memory in the host computer, asynchronously reading (508) by the host computer the packets of data (522) written by the accelerator to the shared memory in the host computer, moving (510) the read data (528) to application memory (513) of the host computer, and incrementing (512) a counter value (518, 526) representing the total number of packets read by the host computer from the shared memory in the host computer.

The method of FIG. 8, however, also includes determining (550) by the host computer (110), using only counter values (524, 526) stored in local memory on the host computer, the number of unread memory segments (542) in the shared memory (159, 532) of the host computer in dependence upon the total number of packets written (524) by the accelerator to the shared memory in the host computer and the total number of packets read (526) by the host computer from the shared memory in the host computer. The host computer can make this determination, calculating the number of unread memory segments (542) in the shared memory of the host computer, by subtracting from the total number of packets written (524) by the accelerator to the shared memory in the host computer the total number of packets read (526) by the host computer from the shared memory in the host computer.

The method of FIG. 8 also includes identifying (552) by the host computer the next unread memory segment (534) in the shared memory (159, 532) on the host computer according to (K+1) modulo N, where K is the total number of packets read (526) by the host computer from the shared memory in the host computer and N (544) is the predetermined number of individual memory segments (532) in the shared memory (159) of the host computer. In the example of FIG. 5, reading (508) data packets from the shared memory in the host computer includes reading (556) unread data from the determined number of unread memory memory segments (542) beginning with the identified next unread memory segment (534).

Figure 9:
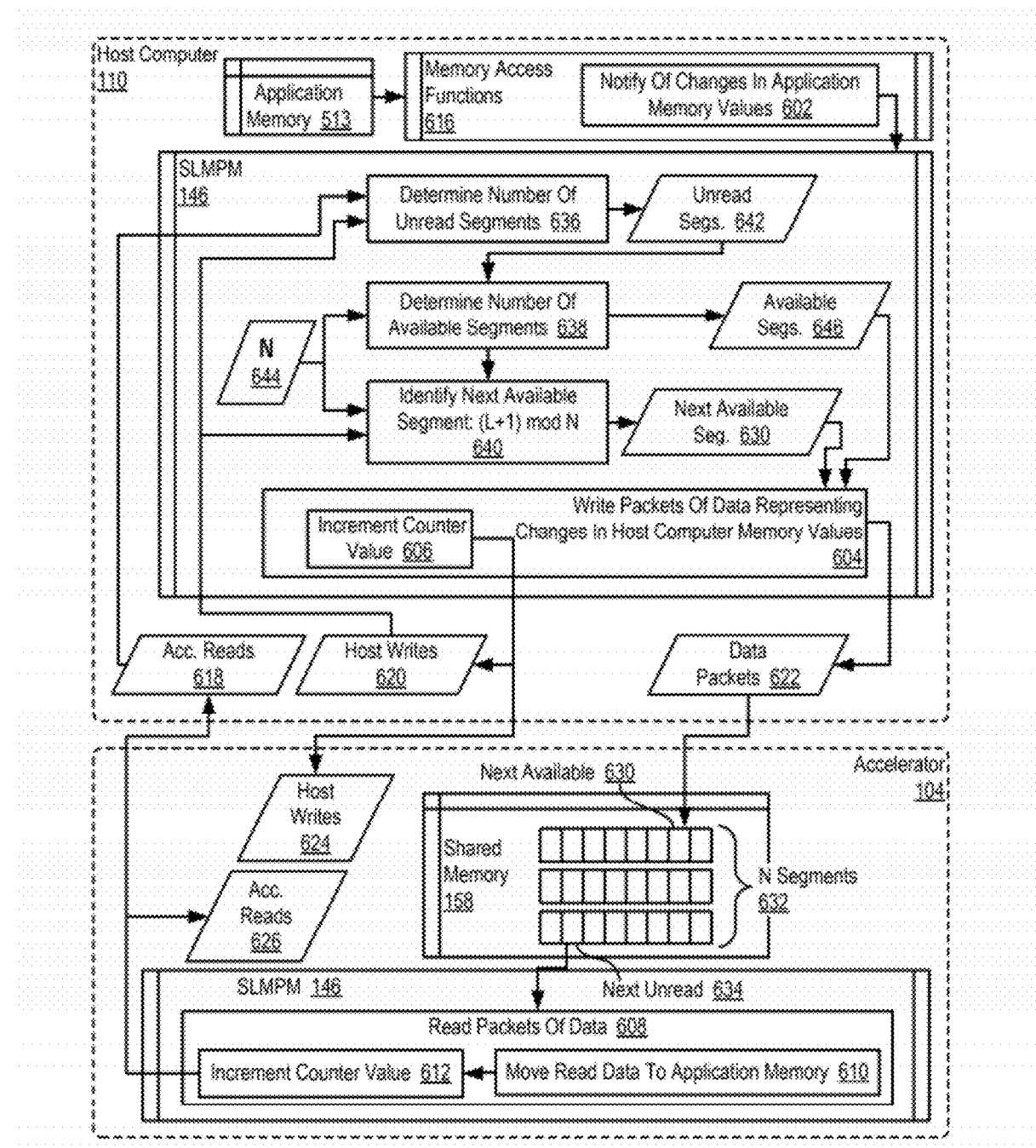

For further explanation, FIG. 9 sets forth a flow chart illustrating a further example method of reducing remote reads of memory in a hybrid computing environment by maintaining remote memory values locally according to embodiments of the present invention. The method of FIG. 9 is implemented in and upon a hybrid computing environment similar to the hybrid computing environments described above in this specification with regard to FIGS. 1-4. Such a hybrid computing environment includes a host computer (110) having a host computer architecture and a number of accelerators (104) having an accelerator architecture, the accelerator architecture optimized, with respect to the host computer architecture, for speed of execution of a particular class of computing functions, the host computer (110) and the accelerators (104) adapted to one another for data communications by an SLMPM (146) and, optionally, by two or more data communications fabrics (128, 130 on FIG. 2) of at least two different fabric types. The host computer has local memory (159 on FIG. 2) shared remotely with the accelerators, and each accelerator has local memory (158) shared remotely with the host computer. The shared memory on both the host and the accelerators are each configured as a predefined number of individual memory segments (632).

The method of FIG. 9 includes notifying (602), by memory access functions (616) of the host computer (110), the SLMPM (146) of changes in host computer application memory values (513). Having been made aware of changes in tracked values, the host computer then ascertains how much data currently can be written to the shared memory of the accelerator and where in the shared memory of the accelerator it can write the data: That is, the method of FIG. 9 also includes determining (636) by the host computer, using only counter values (618, 620) stored in local memory on the host computer, a number of unread memory segments (642) in the shared memory (158, 632) of the accelerator in dependence upon the total number of packets written (620) by the host computer to the shared memory in the accelerator and the total number of packets read (618) by the accelerator from the shared memory in the accelerator. The host computer makes this determination, calculating the number of unread memory segments in the shared memory of the accelerator, by subtracting from the total number of packets written (620) by the host computer to the shared memory in the accelerator the total number of packets read (618) by the accelerator from the shared memory in the accelerator.

The method of FIG. 9 also includes determining (638) by the host computer, using only counter values (618, 620) stored in local memory on the host computer, the number of memory segments (646) in the shared memory of the accelerator available to receive data packets in dependence upon the predetermined number N (644) of individual memory segments (632) in the shared memory (158) of the accelerator and the number of unread memory segments in the shared memory of the accelerator. This determination, calculating the number of memory segments in the shared memory of the accelerator available to receive data packets, can be made by subtracting from the predetermined number N (644) of individual memory segments in the shared memory of the accelerator the number of unread memory segments (642) in the shared memory of the accelerator—with the number of unread memory segments (642) in the shared memory of the accelerator calculated as described just above—subtracting from the total number of packets written (620) by the host computer to the shared memory in the accelerator the total number of packets read (618) by the accelerator from the shared memory in the accelerator.

The method of FIG. 9 also includes identifying (640) by the host computer the next available memory segment (630) in the shared memory of the accelerator according to (L+1) modulo N, where L is the total number of packets written (620) by the host computer to the shared memory of the accelerator and N (644) is the predetermined number of individual memory segments.

The method of FIG. 9 also includes writing (604) by the host computer when one or more memory values in host computer application memory (513) change, through the SLMPM (146) to the shared memory (158) of an accelerator beginning at the next available memory segment (530) one or more packets (622) of data representing the changes in host computer memory values. Such writing (604) in this example includes incrementing (606), in both local shadow memory (620) on the host computer and in remote shared memory (624) on the accelerator, a counter value representing the total number of packets written by the host computer to the shared memory in the accelerator.

The method of FIG. 9 also includes reading (608) by the accelerator, asynchronously with respect to the writing (604), from the shared memory (158) in the accelerator beginning with a next unread memory segment (634), the packets of data (622) written by the host computer to the shared memory in the accelerator. In this example, such reading (608) includes moving (610) the read data to application memory of the accelerator and incrementing (612), in both local shadow memory (626) on the accelerator and in remote shared memory (618) on the host computer, a counter value representing the total number of packets read by the accelerator from the shared memory in the accelerator.

Figure 10:
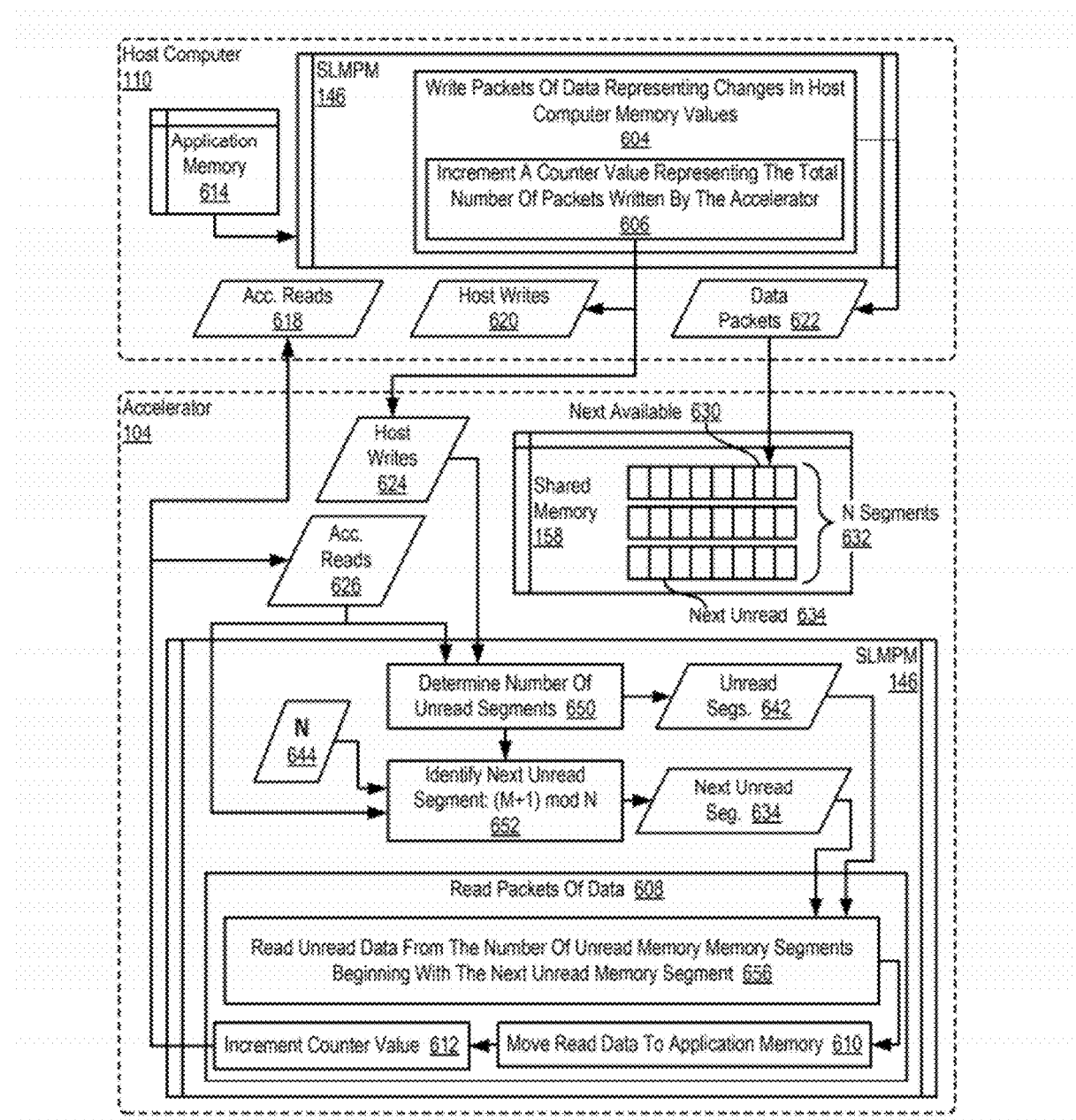

For further explanation, FIG. 10 sets forth a flow chart illustrating a further example method of reducing remote reads of memory in a hybrid computing environment by maintaining remote memory values locally according to embodiments of the present invention. The method of FIG. 10 is implemented in and upon a hybrid computing environment similar to the hybrid computing environments described above in this specification with regard to FIGS. 1-4. Such a hybrid computing environment includes a host computer (110) having a host computer architecture and a number of accelerators (104) having an accelerator architecture, the accelerator architecture optimized, with respect to the host computer architecture, for speed of execution of a particular class of computing functions, the host computer (110) and the accelerators (104) adapted to one another for data communications by an SLMPM (146) and, optionally, by two or more data communications fabrics (128, 130 on FIG. 2) of at least two different fabric types. The host computer has local memory (159) shared remotely with the accelerators, and each accelerator has local memory (158 on FIG. 2) shared remotely with the host computer. The shared memory on both the host and the accelerators are each configured as a predefined number of individual memory segments (532). The method of FIG. 10 is similar to the method of FIG. 9, including as it does writing (604) by a host computer (110) to the shared memory (158, 632) of an accelerator packets of data (622) representing changes in host computer memory values (614), incrementing (606) a counter value (620, 624) representing the total number of packets written by the host computer to the shared memory in the accelerator, asynchronously reading (608) by the accelerator the packets of data (622) written by the host computer to the shared memory in the accelerator, moving (610) the read data to application memory of the host computer, and incrementing (612) a counter value (618, 626) representing the total number of packets read by the host computer from the shared memory in the host computer.

The method of FIG. 10, however, also includes determining (650) by the accelerator (104), using only counter values (625, 626) stored in local memory on the accelerator, the number of unread memory segments (642) in the shared memory (158) of the accelerator in dependence upon the total number of packets written (624) by the host computer to the shared memory in the accelerator and the total number of packets read (626) by the accelerator from the shared memory in the accelerator. This determination, calculating the number of unread memory segments in the shared memory of the accelerator, can be carried out by subtracting from the total number of packets written (624) by the host computer to the shared memory in the accelerator the total number of packets read (626) by the accelerator from the shared memory in the accelerator. The method of FIG. 10 also includes identifying (652) by the accelerator the next unread memory segment (634) according to (M+1) modulo N, where M is the total number of packets read (626) by the accelerator from the shared memory in the accelerator and N (644) is the predetermined number of individual memory segments in the shared memory of the accelerator. In the method of FIG. 10, reading (608) from the shared memory in the host computer includes reading (656) unread data from the determined number of unread memory memory segments (642) beginning with the identified next unread memory segment (634).

Example embodiments of the present invention are described largely in the context of reducing remote reads of memory by maintaining remote memory values locally in a fully functional hybrid computing environment. Readers of skill in the art will recognize, however, that method aspects of the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product. Persons skilled in the art will recognize immediately that, although some of the example embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of reducing remote reads of memory in a hybrid computing environment by maintaining remote memory values locally, the method comprising:

writing by an accelerator when one or more memory values in accelerator application memory change, to shared memory of the host computer, one or more packets of data representing the changes in accelerator memory values, including incrementing a counter value representing the total number of packets written by the accelerator to the shared memory in the host computer; and reading by the host computer asynchronously with respect to the writing, from the shared memory in the host computer, the packets of data written by the accelerator to the shared memory in the host computer, including moving the read data to application memory of the host computer and incrementing a counter value representing the total number of packets read by the host computer from the shared memory in the host computer.

2. The method of claim 1 further comprising notifying, by memory access functions of the accelerator, a system level message passing module of changes in accelerator application memory values.

3. The method of claim 1 wherein incrementing a counter value representing the total number of packets read by the host computer from the shared memory in the host computer further comprises:
incrementing the counter value in local shadow memory in the host computer every time the host computer reads packets of data from the shared memory in the host computer; and
incrementing the counter value in remote shared memory on the accelerator only when a number of unread memory segments in the shared memory in the host computer reaches a predetermined unread memory threshold.

4. The method of claim 1 further comprising:
determining by the accelerator, using only counter values stored in local memory on the accelerator, a number of unread memory segments in the shared memory of the host computer in dependence upon the total number of packets written by the accelerator to the shared memory in the host computer and the total number of packets read by the host computer from the shared memory in the host computer;
determining by the accelerator, using only counter values stored in local memory on the accelerator, a number of memory segments in the shared memory of the host computer available to receive data packets in dependence upon a predetermined number of individual memory segments in the shared memory of the host computer and the number of unread memory segments in the shared memory of the host computer; and
identifying by the accelerator the next available memory segment in the shared memory of the host computer according to (J+1) modulo N, where J is the total number of packets written by the accelerator to the shared memory of the host computer and N is the predetermined number of individual memory segments.

5. The method of claim 1 further comprising:
determining by the host computer, using only counter values stored in local memory on the host computer, a number of unread memory segments in the shared memory of the host computer in dependence upon the total number of packets written by the accelerator to the shared memory in the host computer and the total number of packets read by the host computer from the shared memory in the host computer; and
calculating by the host computer, using only counter values stored in local memory on the host computer, the number of unread memory segments in the shared memory of the host computer by subtracting from the total number of packets written by the accelerator to the shared memory in the host computer the total number of packets read by the host computer from the shared memory in the host computer; and
identifying by the host computer the next unread memory segment according to (K+1) modulo N, where K is the total number of packets read by the host computer from the shared memory in the host computer and N is the predetermined number of individual memory segments in the shared memory of the host computer;
wherein reading from the shared memory in the accelerator further comprises reading unread data from the determined number of unread memory segments beginning with an identified next unread memory segment.

6. A method of reducing remote reads of memory in a hybrid computing environment by maintaining remote memory values locally, the method comprising:
writing by the host computer when one or more memory values in host computer application memory change, to shared memory of an accelerator, one or more packets of data representing the changes in host computer memory values, including incrementing a counter value representing the total number of packets written by the host computer to the shared memory in the accelerator; and
reading by the accelerator asynchronously with respect to the writing, from the shared memory in the accelerator, the packets of data written by the host computer to the shared memory in the accelerator, including moving the read data to application memory of the accelerator and incrementing a counter value representing the total number of packets read by the accelerator from the shared memory in the accelerator.

7. The method of claim 6 further comprising notifying, by memory access functions of the host computer, a system level message passing module of changes in host computer application memory values.

8. The method of claim 6 wherein incrementing a counter value representing the total number of packets read by the accelerator from the shared memory in the accelerator further comprises:
incrementing the counter value in local shadow memory in the accelerator every time the accelerator reads packets of data from the shared memory in the accelerator; and
incrementing the counter value in remote shared memory on the host computer only when a number of unread memory segments in the shared memory in the accelerator reaches a predetermined unread memory threshold.

9. The method of claim 6 further comprising:
determining by the host computer, using only counter values stored in local memory on the host computer, a number of unread memory segments in the shared memory of the accelerator in dependence upon the total number of packets written by the host computer to the shared memory in the accelerator and the total number of packets read by the accelerator from the shared memory in the accelerator;
determining by the host computer, using only counter values stored in local memory on the host computer, a number of memory segments in the shared memory of the accelerator available to receive data packets in dependence upon a predetermined number of individual memory segments in the shared memory of the accelerator and the number of unread memory segments in the shared memory of the accelerator; and
identifying by the host computer the next available memory segment in the shared memory of the accelerator according to (L+1) modulo N, where L is the total number of packets written by the host computer to the shared memory of the accelerator and N is the predetermined number of individual memory segments.

10. The method of claim 6 further comprising:
determining by the accelerator, using only counter values stored in local memory on the accelerator, a number of unread memory segments in the shared memory of the accelerator in dependence upon the total number of packets written by the host computer to the shared memory in the accelerator and the total number of packets read by the accelerator from the shared memory in the accelerator; and calculating by the accelerator, using only counter values stored in local memory on the accelerator, the number of unread memory segments in the shared memory of the accelerator by subtracting from the total number of packets written by the host computer to the shared memory in the accelerator the total number of packets read by the accelerator from the shared memory in the accelerator; and identifying by the accelerator the next unread memory segment according to (M+1) modulo N, where M is the total number of packets read by the accelerator from the shared memory in the accelerator and N is the predetermined number of individual memory segments in the shared memory of the accelerator;

wherein reading from the shared memory in the host computer further comprises reading unread data from the determined number of unread memory segments beginning with an identified next unread memory segment.

11. A hybrid computing environment for reducing remote reads of memory by maintaining remote memory values locally, the hybrid computing environment including computer memory and a computer processor, the computer memory including computer program instructions that, when executed by the computer processor, cause the hybrid computing environment to carry out the steps of:

writing by an accelerator when one or more memory values in accelerator application memory change, to shared memory of the host computer, one or more packets of data representing the changes in accelerator memory values, including incrementing a counter value representing the total number of packets written by the accelerator to the shared memory in the host computer; and reading by the host computer asynchronously with respect to the writing, from the shared memory in the host computer, the packets of data written by the accelerator to the shared memory in the host computer, including moving the read data to application memory of the host computer and incrementing a counter value representing the total number of packets read by the host computer from the shared memory in the host computer.

12. The hybrid computing environment of claim 11 further comprising computer program instruction capable of causing the hybrid computing environment to function by notifying, by memory access functions of the accelerator, a system level message passing module of changes in accelerator application memory values.

13. The hybrid computing environment of claim 11 wherein incrementing a counter value representing the total number of packets read by the host computer from the shared memory in the host computer further comprises:

incrementing the counter value in local shadow memory in the host computer every time the host computer reads packets of data from the shared memory in the host computer; and incrementing the counter value in remote shared memory on the accelerator only when the number of unread memory segments in the shared memory in the host computer reaches a predetermined unread memory threshold.

14. The hybrid computing environment of claim 11 further comprising computer program instruction capable of causing the hybrid computing environment to function by:

determining by the accelerator, using only counter values stored in local memory on the accelerator, a number of unread memory segments in the shared memory of the host computer in dependence upon the total number of packets written by the accelerator to the shared memory in the host computer and the total number of packets read by the host computer from the shared memory in the host computer;

determining by the accelerator, using only counter values stored in local memory on the accelerator, a number of memory segments in the shared memory of the host computer available to receive data packets in dependence upon the predetermined number of individual memory segments in the shared memory of the host computer and the number of unread memory segments in the shared memory of the host computer; and identifying by the accelerator the next available memory segment in the shared memory of the host computer according to (J+1) modulo N, where J is the total number of packets written by the accelerator to the shared memory of the host computer and N is a predetermined number of individual memory segments.

15. The hybrid computing environment of claim 11 further comprising computer program instruction capable of causing the hybrid computing environment to function by:

determining by the host computer, using only counter values stored in local memory on the host computer, a number of unread memory segments in the shared memory of the host computer in dependence upon the total number of packets written by the accelerator to the shared memory in the host computer and the total number of packets read by the host computer from the shared memory in the host computer; and calculating by the host computer, using only counter values stored in local memory on the host computer, the number of unread memory segments in the shared memory of the host computer by subtracting from the total number of packets written by the accelerator to the shared memory in the host computer the total number of packets read by the host computer from the shared memory in the host computer; and identifying by the host computer the next unread memory segment according to (K+1) modulo N, where K is the total number of packets read by the host computer from the shared memory in the host computer and N is the predetermined number of individual memory segments in the shared memory of the host computer;

wherein reading from the shared memory in the accelerator further comprises reading unread data from the determined number of unread memory segments beginning with an identified next unread memory segment.

16. A non-transitory computer program product for reducing remote reads of memory in a hybrid computing environment by maintaining remote memory values locally, the computer program product disposed in a recordable, computer readable medium, the computer program product comprising computer program instructions capable, when executed, of causing the hybrid computing environment to function by:

writing by an accelerator when one or more memory values in accelerator application memory change, to the shared memory of the host computer, one or more packets of data representing the changes in accelerator memory values, including incrementing a counter value representing the total number of packets written by the accelerator to the shared memory in the host computer; and reading by the host computer asynchronously with respect to the writing, from the shared memory in the host computer, the packets of data written by the accelerator to the shared memory in the host computer, including moving the read data to application memory of the host computer and incrementing a counter value representing the total number of packets read by the host computer from the shared memory in the host computer.

17. The computer program product of claim 16 further comprising computer program instructions capable of causing the hybrid computing environment to function by notifying, by memory access functions of the accelerator, a system level message passing module of changes in accelerator application memory values.

18. The computer program product of claim 16 wherein incrementing a counter value representing the total number of packets read by the host computer from the shared memory in the host computer further comprises:

incrementing the counter value in local shadow memory in the host computer every time the host computer reads packets of data from the shared memory in the host computer; and incrementing the counter value in remote shared memory on the accelerator only when a number of unread memory segments in the shared memory in the host computer reaches a predetermined unread memory threshold.

19. The computer program product of claim 16 further comprising computer program instructions capable of causing the hybrid computing environment to function by:

determining by the accelerator, using only counter values stored in local memory on the accelerator, a number of unread memory segments in the shared memory of the host computer in dependence upon the total number of packets written by the accelerator to the shared memory in the host computer and the total number of packets read by the host computer from the shared memory in the host computer;

determining by the accelerator, using only counter values stored in local memory on the accelerator, a number of memory segments in the shared memory of the host computer available to receive data packets in dependence upon a predetermined number of individual memory segments in the shared memory of the host computer and the number of unread memory segments in the shared memory of the host computer; and identifying by the accelerator the next available memory segment in the shared memory of the host computer according to (J+1) modulo N, where J is the total number of packets written by the accelerator to the shared memory of the host computer and N is the predetermined number of individual memory segments.

20. The computer program product of claim 16 further comprising computer program instructions capable of causing the hybrid computing environment to function by:

determining by the host computer, using only counter values stored in local memory on the host computer, a number of unread memory segments in the shared memory of the host computer in dependence upon the total number of packets written by the accelerator to the shared memory in the host computer and the total number of packets read by the host computer from the shared memory in the host computer; and calculating by the host computer, using only counter values stored in local memory on the host computer, the number of unread memory segments in the shared memory of the host computer by subtracting from the total number of packets written by the accelerator to the shared memory in the host computer the total number of packets read by the host computer from the shared memory in the host computer; and identifying by the host computer the next unread memory segment according to (K+1) modulo N, where K is the total number of packets read by the host computer from the shared memory in the host computer and N is the predetermined number of individual memory segments in the shared memory of the host computer;

wherein reading from the shared memory in the accelerator further comprises reading unread data from the determined number of unread memory segments beginning with an identified next unread memory segment.

* * * * *